(12) United States Patent
Funatsu

(10) Patent No.: US 11,178,325 B2
(45) Date of Patent: Nov. 16, 2021

(54) IMAGE CAPTURING CONTROL APPARATUS THAT ISSUES A NOTIFICATION WHEN FOCUS DETECTING REGION IS OUTSIDE NON-BLUR REGION, CONTROL METHOD, AND STORAGE MEDIUM

(71) Applicant: CANON KABUSHIKI KAISHA, Tokyo (JP)

(72) Inventor: Yoshihiro Funatsu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 607 days.

(21) Appl. No.: 15/869,768

(22) Filed: Jan. 12, 2018

(65) Prior Publication Data
US 2018/0205874 A1    Jul. 19, 2018

(30) Foreign Application Priority Data
Jan. 16, 2017   (JP) .............................. JP2017-005270

(51) Int. Cl.
H04N 5/228        (2006.01)
H04N 5/232        (2006.01)
(Continued)

(52) U.S. Cl.
CPC ... *H04N 5/232122* (2018.08); *G06F 3/03545* (2013.01); *G06F 3/0488* (2013.01);
(Continued)

(58) Field of Classification Search
CPC ....... H04N 5/232122; H04N 5/232939; H04N 5/232941; H04N 5/23212; H04N 5/23264;
(Continued)

(56) References Cited

U.S. PATENT DOCUMENTS

2005/0195317 A1*  9/2005  Myoga ................. H04N 5/2354
                                                   348/370
2007/0286586 A1   12/2007  Honma
(Continued)

FOREIGN PATENT DOCUMENTS

CN    101753844 A    6/2010
CN    102216824 A    10/2011
(Continued)

OTHER PUBLICATIONS

The above foreign patent document was cited in a Dec. 4, 2019 Chinese Office Action, which is enclosed with an English Translation, that issued in Chinese Patent Application No. 201810011143.0.
The above foreign patent documents were cited in a Jul. 3, 2020 Chinese Office Action, which is enclosed with an English Translation, that issued in Chinese Patent Application No. 201810011143.0.

*Primary Examiner* — Usman A Khan
(74) *Attorney, Agent, or Firm* — Cowan, Liebowitz & Latman, P.C.

(57) ABSTRACT

There is provided an image capturing control apparatus. A non-blur region setting unit sets, within a screen, a non-blur region to which blur processing is not applied. In response to an operation performed by a user, a focus detection region setting unit sets, within the screen, a focus detection region in which focus detection is performed. When the focus detection region is outside the non-blur region, a control unit performs control to issue a notification that is not issued when the focus detection region is inside the non-blur region.

15 Claims, 13 Drawing Sheets

(51) Int. Cl.
*G06F 3/0488* (2013.01)
*G06F 3/0354* (2013.01)
*G06F 3/0484* (2013.01)
*H04N 5/262* (2006.01)

(52) U.S. Cl.
CPC ...... *G06F 3/04842* (2013.01); *G06F 3/04883* (2013.01); *H04N 5/23264* (2013.01); *H04N 5/232939* (2018.08); *H04N 5/232941* (2018.08); *H04N 5/2621* (2013.01)

(58) Field of Classification Search
CPC .............. H04N 5/23293; H04N 5/2621; G06F 3/03545; G06F 3/04842; G06F 3/0488; G06F 3/04883
USPC ...................................... 348/208.4
See application file for complete search history.

(56) References Cited

U.S. PATENT DOCUMENTS

| | | | | |
|---|---|---|---|---|
| 2009/0096897 A1* | 4/2009 | Saito | ........................ | G06T 5/008 348/241 |
| 2014/0168448 A1* | 6/2014 | Ozawa | ............... | H04N 5/23296 348/170 |

FOREIGN PATENT DOCUMENTS

| | | | |
|---|---|---|---|
| CN | 103873749 | A | 6/2014 |
| CN | 103945109 | A | 7/2014 |
| CN | 105960663 | A | 9/2016 |
| CN | 106060377 | A | 10/2016 |
| JP | 2011-166301 | A | 8/2011 |

* cited by examiner

IMAGE CAPTURING CONTROL APPARATUS THAT ISSUES A NOTIFICATION WHEN FOCUS DETECTING REGION IS OUTSIDE NON-BLUR REGION, CONTROL METHOD, AND STORAGE MEDIUM

BACKGROUND OF THE INVENTION

Field of the Invention

The present invention relates to an image capturing control apparatus, a control method, and a storage medium.

Description of the Related Art

An image capturing apparatus with a creative filter shooting mode, in which an image is recorded with the addition of a special blur effect and the adjustment of contrast at the time of shooting, is known. With the use of a diorama mode, which is one type of the creative filter shooting mode, the effect similar to that of a miniature photograph is achieved by emphasizing an in-focus region and an out-of-focus region. An out-of-focus region is presented by applying a blur effect thereto. A user sets a region to which the blur effect is applied before shooting. Specifically, the user sets a region to be clearly presented (hereinafter, a diorama frame) on an image displayed on a liquid crystal display. The image capturing apparatus does not apply the blur effect to the inside of the diorama frame, and applies the blur effect to the outside of the frame.

Japanese Patent Laid-Open No. 2011-166301 suggests an invention to perform control so that the direction of the diorama effect does not change even if the direction of an image capturing apparatus changes in a diorama mode. Furthermore, in a conventional diorama mode, shooting is performed with a focus detection region set at the center of a diorama frame. Therefore, a region that is brought into focus by focus detection matches a region to which the blur effect is not applied. However, when there is a low-contrast subject at the center of the diorama frame, the precision of focus detection drops.

If the diorama frame and the focus detection region (AF frame) can be set independently of each other, the degree of freedom of shooting settings increases, and the precision of focusing can also be improved by setting the focus detection region at the position of a high-contrast subject. However, if the focus detection region is accidentally set outside the diorama frame, there is a possibility of shooting a failed photograph in which the entire screen is out of focus. For example, assume a case where the distance to a subject inside the diorama frame is different from the distance to a subject in the focus detection region outside the diorama frame. In this case, the subject inside the diorama frame is out of focus, and moreover, the blur effect is applied to the subject in the focus detection region, with the result that the appearance is out of focus.

SUMMARY OF THE INVENTION

The present embodiment has been made in view of the foregoing situation, and provides a technique for reducing the possibility that a user accidentally sets an AF frame outside a diorama frame, while still enabling the AF frame to be set outside the diorama frame.

According to a first aspect of the present invention, there is provided an image capturing control apparatus, comprising: a non-blur region setting unit configured to set, within a screen, a non-blur region to which blur processing is not applied; a focus detection region setting unit configured to, in response to an operation performed by a user, set, within the screen, a focus detection region in which focus detection is performed; and a control unit configured to, when the focus detection region is outside the non-blur region, perform control to issue a notification that is not issued when the focus detection region is inside the non-blur region.

According to a second aspect of the present invention, there is provided an image capturing control apparatus, comprising: a non-blur region setting unit configured to set, within a screen, a non-blur region to which blur processing is not applied; a focus detection region setting unit configured to, in response to a first operation and a second operation, move, within the screen, a focus detection region in which focus detection is performed; and a control unit configured to perform control to when the first operation has been performed, move the focus detection region regardless of whether the focus detection region is to be moved to the outside of the non-blur region, and when the second operation has been performed, move the focus detection region in a case where a position to which the focus detection region is to be moved in response to the second operation is inside the non-blur region, and not move the focus detection region in a case where the position to which the focus detection region is to be moved in response to the second operation is outside the non-blur region.

According to a third aspect of the present invention, there is provided an image capturing control apparatus, comprising: a non-blur region setting unit configured to, in response to an operation performed by a user, move, within a screen, a non-blur region to which blur processing is not applied; a focus detection region setting unit configured to, in response to an operation performed by the user, move, within the screen, a focus detection region in which focus detection is performed; and a control unit configured to, when a shooting mode in which the blur processing is applied has been set, perform control to accept the operation performed by the user to move the non-blur region before performing control to accept the operation performed by the user to move the focus detection region.

According to a fourth aspect of the present invention, there is provided an image capturing control apparatus, comprising: a non-blur region setting unit configured to set a non-blur region to which blur processing is not applied within a screen that displays a display element indicating the non-blur region and a display element indicating a focus detection region in which focus detection is performed together with a live-view image captured using an image capturing unit; a focus detection region setting unit configured to set the focus detection region within the screen; and a control unit configured to perform control to apply image processing different from the blur processing to the outside of the non-blur region so that the inside and the outside of the non-blur region are identifiable and visually recognizable on the screen.

According to a fifth aspect of the present invention, there is provided an image capturing control apparatus, comprising: a non-blur region setting unit configured to move, within a screen, a non-blur region to which blur processing is not applied; a focus detection region setting unit configured to move, within the screen, a focus detection region in which focus detection is performed; and a control unit configured to perform control to move the non-blur region in response to an operation of moving the non-blur region, and also move the focus detection region in accordance with the movement of the non-blur region, and move the focus detection region without moving the non-blur region in response to an operation of moving the focus detection region.

According to a sixth aspect of the present invention, there is provided an image capturing control apparatus, comprising: a non-blur region setting unit configured to move, within a screen, a non-blur region to which blur processing is not applied; a focus detection region setting unit configured to move, within the screen, a focus detection region in which focus detection is performed; and a control unit configured to perform control to move the focus detection region in response to an operation of moving the focus detection region, and also move the non-blur region in accordance with the movement of the focus detection region, and move the non-blur region without moving the focus detection region in response to an operation of moving the non-blur region.

According to a seventh aspect of the present invention, there is provided a control method executed by an image capturing control apparatus, comprising: setting, within a screen, a non-blur region to which blur processing is not applied; in response to an operation performed by a user, setting, within the screen, a focus detection region in which focus detection is performed; and when the focus detection region is outside the non-blur region, performing control to issue a notification that is not issued when the focus detection region is inside the non-blur region.

According to an eighth aspect of the present invention, there is provided a control method executed by an image capturing control apparatus, comprising: setting, within a screen, a non-blur region to which blur processing is not applied; in response to a first operation and a second operation, moving, within the screen, a focus detection region in which focus detection is performed; and performing control to when the first operation has been performed, move the focus detection region regardless of whether the focus detection region is to be moved to the outside of the non-blur region, and when the second operation has been performed, move the focus detection region in a case where a position to which the focus detection region is to be moved in response to the second operation is inside the non-blur region, and not move the focus detection region in a case where the position to which the focus detection region is to be moved in response to the second operation is outside the non-blur region.

According to a ninth aspect of the present invention, there is provided a control method executed by an image capturing control apparatus, comprising: in response to an operation performed by a user, moving, within a screen, a non-blur region to which blur processing is not applied; in response to an operation performed by the user, moving, within the screen, a focus detection region in which focus detection is performed; and when a shooting mode in which the blur processing is applied has been set, performing control to accept the operation performed by the user to move the non-blur region before performing control to accept the operation performed by the user to move the focus detection region.

According to a tenth aspect of the present invention, there is provided a control method executed by an image capturing control apparatus, comprising: setting a non-blur region to which blur processing is not applied within a screen that displays a display element indicating the non-blur region and a display element indicating a focus detection region in which focus detection is performed together with a live-view image captured using an image capturing unit; setting the focus detection region within the screen; and performing control to apply image processing different from the blur processing to the outside of the non-blur region so that the inside and the outside of the non-blur region are identifiable and visually recognizable on the screen.

According to an eleventh aspect of the present invention, there is provided a control method executed by an image capturing control apparatus, comprising: moving, within a screen, a non-blur region to which blur processing is not applied; moving, within the screen, a focus detection region in which focus detection is performed; and performing control to move the non-blur region in response to an operation of moving the non-blur region, and also move the focus detection region in accordance with the movement of the non-blur region, and move the focus detection region without moving the non-blur region in response to an operation of moving the focus detection region.

According to a twelfth aspect of the present invention, there is provided a control method executed by an image capturing control apparatus, comprising: moving, within a screen, a non-blur region to which blur processing is not applied; moving, within the screen, a focus detection region in which focus detection is performed; and performing control to move the focus detection region in response to an operation of moving the focus detection region, and also move the non-blur region in accordance with the movement of the focus detection region, and move the non-blur region without moving the focus detection region in response to an operation of moving the non-blur region.

According to a thirteenth aspect of the present invention, there is provided a non-transitory computer-readable storage medium which stores a program for causing a computer to execute a control method comprising: setting, within a screen, a non-blur region to which blur processing is not applied; in response to an operation performed by a user, setting, within the screen, a focus detection region in which focus detection is performed; and when the focus detection region is outside the non-blur region, performing control to issue a notification that is not issued when the focus detection region is inside the non-blur region.

According to a fourteenth aspect of the present invention, there is provided a non-transitory computer-readable storage medium which stores a program for causing a computer to execute a control method comprising: in response to an operation performed by a user, moving, within a screen, a non-blur region to which blur processing is not applied; in response to an operation performed by the user, moving, within the screen, a focus detection region in which focus detection is performed; and when a shooting mode in which the blur processing is applied has been set, performing control to accept the operation performed by the user to move the non-blur region before performing control to accept the operation performed by the user to move the focus detection region.

According to a fifteenth aspect of the present invention, there is provided a non-transitory computer-readable storage medium which stores a program for causing a computer to execute a control method comprising: setting a non-blur region to which blur processing is not applied within a screen that displays a display element indicating the non-blur region and a display element indicating a focus detection region in which focus detection is performed together with a live-view image captured using an image capturing unit; setting the focus detection region within the screen; and performing control to apply image processing different from the blur processing to the outside of the non-blur region so that the inside and the outside of the non-blur region are identifiable and visually recognizable on the screen.

Further features of the present invention will become apparent from the following description of exemplary embodiments with reference to the attached drawings.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1A:
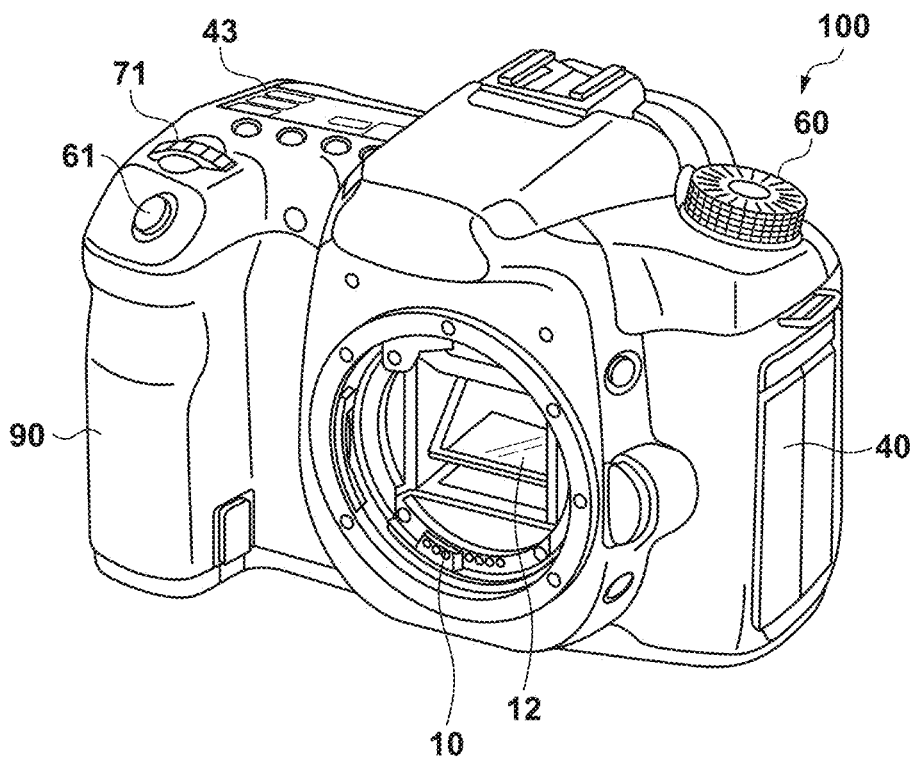
FIGS. 1A and 1B are external views of a digital camera 100.
Figure 1B:
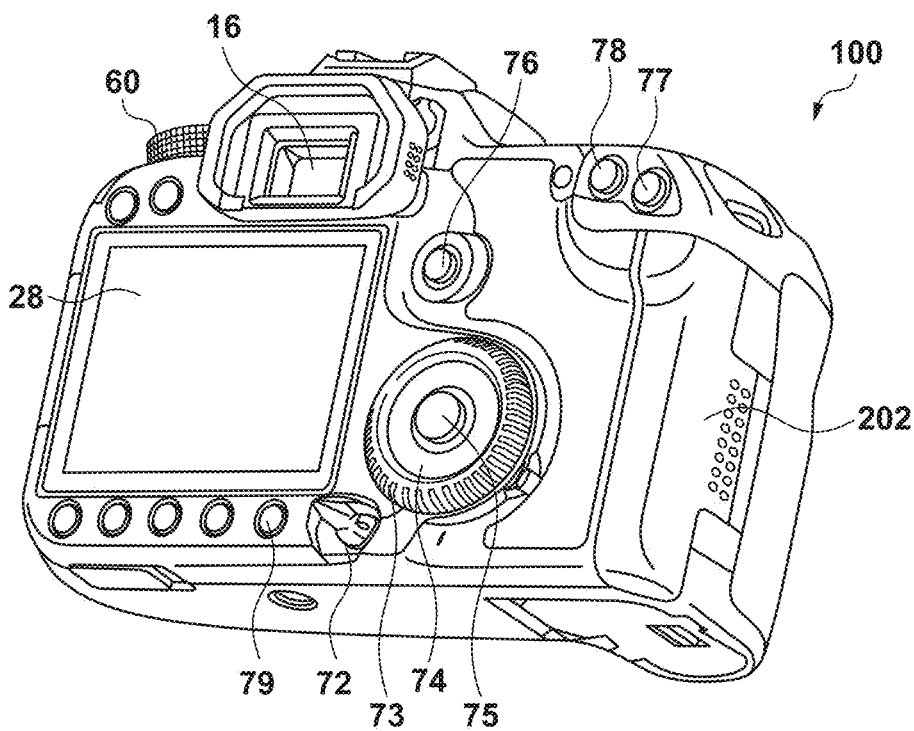

FIGS. 1A and 1B are external views of a digital camera 100 as one example of an image capturing control apparatus to which the present invention can be applied. FIG. 1A is a perspective view of a front face of the digital camera 100, and FIG. 1B is a perspective view of a back face of the digital camera 100. In FIG. 1B, a display unit 28 is a display unit that displays images and various types of information and is mounted on the back face of the camera. An out-of-viewfinder display unit 43 is a display unit mounted on a top face of the camera, and displays a variety of setting values of the camera including a shutter speed and a diaphragm. A shutter button 61 is an operation unit for issuing a shooting instruction. A mode change switch 60 is an operation unit for switching between various types of modes. A terminal cover 40 is a cover for protecting a connector (not shown) for, for example, a connection cable that connects between an external device and the digital camera 100. A main electronic dial 71 is a rotary operation member included in an operation unit 70 (described later with reference to FIG. 2), and a user can, for example, change the setting values of the shutter speed, the diaphragm, and so forth by rotating this main electronic dial 71. A power switch 72 is an operation member that switches between ON and OFF of the power of the digital camera 100. A sub-electronic dial 73 is a rotary operation member included in the operation unit 70, and is used to move a selection frame, perform image switching, and so forth. A crisscross key 74 is a crisscross key (four-directional key) included in the operation unit 70, and its upper, lower, left, and right portions can each be pushed. By pressing a specific portion of the crisscross key 74, the user can perform an operation corresponding to the pressed portion. A SET button 75 is a push button included in the operation unit 70, and is used mainly to decide a selected item, for example. An LV button 76 is a button that is included in the operation unit 70 and switches between ON and OFF (display and non-display) of live view (hereinafter, LV) via a menu button. It is used for an instruction for starting or stopping the shooting (recording) of moving images in a moving image shooting mode. An enlarge button 77 is an operation button that is included in the operation unit 70 and intended to switch between ON and OFF of an enlarge mode in live-view display (hereinafter, LV display) of a shooting mode, and to change an enlargement factor during the enlarge mode. In a reproduction mode, the enlarge button 77 functions as an enlarge button for enlarging a reproduced image and increasing the enlargement factor. A reduce button 78 is a button that is included in the operation unit 70 and intended to lower the enlargement factor of a reproduced image in an enlarged state to reduce a displayed image. A reproduction button 79 is an operation button that is included in the operation unit 70 and switches between a shooting mode and a reproduction mode. By pressing the reproduction button 79 during a shooting mode, the user can cause the digital camera 100 to make a transition to a reproduction mode and display the latest image among the images recorded in a recording medium 200 on the display unit 28. An instant return mirror 12 is moved up and down by a non-illustrated actuator in response to an instruction from a system control unit 50 (described later with reference to FIG. 2). A communication terminal 10 is a communication terminal with which the digital camera 100 communicates with the lens side (attachable and detachable). An eyepiece viewfinder 16 is a look-through type viewfinder through which the user observes a focusing screen 13 (described later with reference to FIG. 2) and checks the focal point and composition of an optical image of a subject obtained through a lens unit 150 (described later with reference to FIG. 2). A cover 202 is a cover for a slot in which the recording medium 200 is housed. A grip unit 90 is a holding unit with a shape that is easily gripped by a right hand when the user is holding the digital camera 100 in position.

Figure 2:
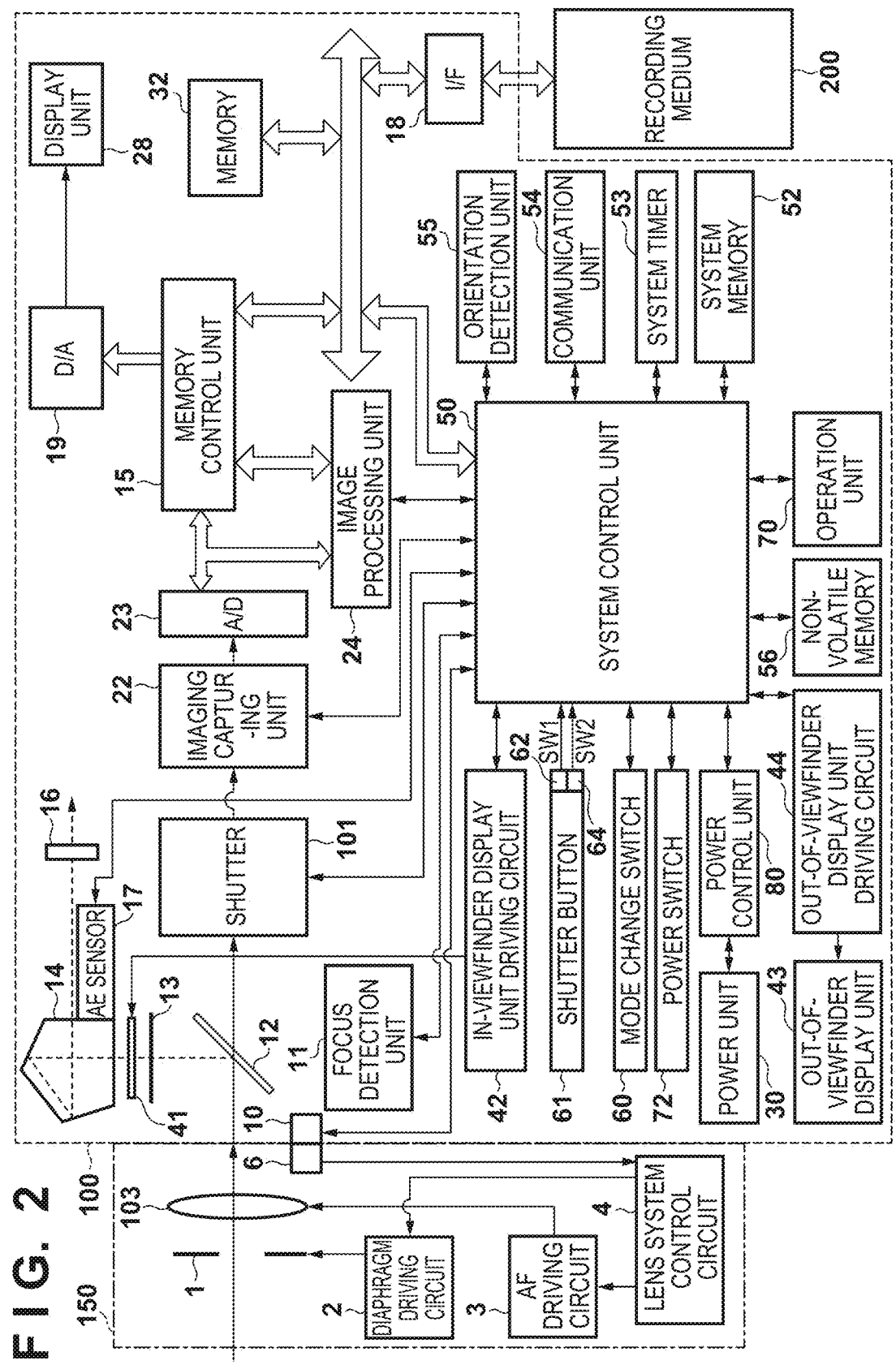
FIG. 2 is a block diagram showing an exemplary configuration of the digital camera 100.

FIG. 2 is a block diagram showing an exemplary configuration of the digital camera 100. In FIG. 2, a lens unit 150 is a lens unit in which an interchangeable photographing lens is installed. Although a lens 103 is normally composed of a plurality of lenses, only one lens is shown here for simplicity. A communication terminal 6 is a communication terminal with which the lens unit 150 communicates with the digital camera 100 side, and the communication terminal 10 is a communication terminal with which the digital camera 100 communicates with the lens unit 150 side. The lens unit 150 communicates with the system control unit 50 via these communication terminals 6 and 10, and achieves an in-focus state by causing an internal lens system control circuit 4 to control a diaphragm 1 via a diaphragm driving circuit 2 and changing the position of the lens 103 via an AF driving circuit 3.

An AE sensor 17 measures the luminance of a subject through the lens unit 150. A focus detection unit 11 outputs defocus amount information to the system control unit 50. The system control unit 50 performs phase-difference AF by controlling the lens unit 150 based on the defocus amount information.

The instant return mirror 12 is moved up and down by the non-illustrated actuator in response to an instruction from the system control unit 50 during exposure, LV shooting (live-view shooting), and shooting of moving images. The instant return mirror 12 is a mirror for switching the direction of a light beam that has been made incident through the lens 103 between the eyepiece viewfinder 16 side and the image capturing unit 22 side. The instant return mirror 12 is normally placed so as to reflect and guide the light beam toward the eyepiece viewfinder 16; on the other hand, during shooting and LV display, it is flipped up to direct the light beam toward the image capturing unit 22 and is retracted from the light beam (mirror up). The central portion of the instant return mirror 12 is a half mirror through which a part of light can be transmitted, and a part of the light beam is transmitted so as to be made incident on the focus detection unit 11 for performing focus detection.

The user can check the focal point and composition of an optical image of the subject obtained through the lens unit 150 by observing the focusing screen 13 via a pentaprism 14 and the eyepiece viewfinder 16.

A shutter 101 is a focal-plane shutter that can freely control an exposure period of the image capturing unit 22 under control of the system control unit 50. The image capturing unit 22 is an image sensor constituted by, for example, a CCD or CMOS sensor that converts the optical image into electrical signals. An A/D converter 23 converts analog signals into digital signals. The A/D converter 23 is used to convert analog signals output from the image capturing unit 22 into digital signals.

An image processing unit 24 applies predetermined pixel interpolation, resize processing (e.g., reduction), color conversion processing, and so forth to data from the A/D converter 23 or to data from a memory control unit 15. The image processing unit 24 also executes predetermined calculation processing using captured image data, and the system control unit 50 performs exposure control and ranging control based on the obtained calculation result. As a result, AF (autofocus) processing, AE (auto exposure) processing, and EF (preliminary flash emission) processing of a TTL (through-the-lens) method are executed. The image processing unit 24 further executes predetermined calculation processing using captured image data, and executes AWB (auto white balance) processing of the TTL method based on the obtained calculation result.

Output data from the A/D converter 23 is written directly to a memory 32 via the image processing unit 24 and the memory control unit 15, or via the memory control unit 15. The memory 32 stores image data that has been obtained by the image capturing unit 22 and converted into digital data by the A/D converter 23, and image data to be displayed on the display unit 28. The memory 32 has a sufficient storage capacity to store a predetermined number of still images, as well as moving images and audio of a predetermined period. Furthermore, the memory 32 doubles as a memory for image display (video memory).

A D/A converter 19 converts data for image display stored in the memory 32 into analog signals, and supplies the analog signals to the display unit 28. Accordingly, image data for display written to the memory 32 is displayed by the display unit 28 via the D/A converter 19. The display unit 28 performs display on a display device, such as an LCD, in accordance with the analog signals from the D/A converter 19. Digital signals that have undergone A/D conversion in the A/D converter 23 and been accumulated in the memory 32 are converted into analog signals by the D/A converter 19, and then sequentially transferred to and displayed on the display unit 28; accordingly, the display unit 28 functions as an electronic viewfinder. Thus, display of through-the-lens images (LV display) can be performed.

An in-viewfinder display unit 41 displays frames indicating focusing points at which autofocus is currently performed (AF frames), icons indicating the statuses of camera settings, and the like via an in-viewfinder display unit driving circuit 42. The out-of-viewfinder display unit 43 displays a variety of setting values of the camera including the shutter speed and the diaphragm via an out-of-viewfinder display unit driving circuit 44.

A non-volatile memory 56 is an electrically erasable and recordable memory; for example, an EEPROM and the like are used thereas. The non-volatile memory 56 stores constants for the operations of the system control unit 50, programs, and the like. The programs mentioned here denote programs for executing various types of flowcharts, which will be described later in the present embodiment.

The system control unit 50 controls an entirety of the digital camera 100. The system control unit 50 realizes later-described various types of processing according to the present embodiment by executing the aforementioned programs recorded in the non-volatile memory 56. The system control unit 50 also performs display control by controlling the memory 32, the D/A converter 19, the display unit 28, and so forth. A system memory 52 is a system memory that is realized by installing a RAM and the like. The constants and variables for the operations of the system control unit 50, the programs that have been read out from the non-volatile memory 56, and the like are deployed to the system memory 52.

A system timer 53 is a timing unit that measures periods used for various types of control, and the time indicated by a built-in clock. The mode change switch 60, a first shutter switch 62, a second shutter switch 64, and the operation unit 70 are operation members for inputting various types of operational instructions to the system control unit 50.

The mode change switch 60 switches an operation mode of the system control unit 50 to one of a still image recording mode, a moving image shooting mode, a reproduction mode, etc. The still image recording mode includes an auto shooting mode, an auto scene discrimination mode, a manual mode, a diaphragm priority mode (Av mode), and a shutter speed priority mode (Tv mode). The still image recording mode also includes various types of scene modes in which shooting settings of different shooting scenes are used, a program AE mode, a custom mode, a diorama mode, etc.

The digital camera 100 is configured such that it can switch directly to one of these modes using the mode change switch 60. Alternatively, the digital camera 100 may be configured such that, after switching to a screen showing a list of shooting modes using the mode change switch 60, it selects one of the plurality of displayed modes and switches to the selected mode using another operation member. Similarly, the moving image shooting mode may include a plurality of modes.

The first shutter switch 62 is turned ON and issues a first shutter switch signal SW1 in the middle of an operation performed on the shutter button 61 mounted on the digital camera 100, that is to say, in response to half-pressing of the shutter button (a shooting preparation instruction). In response to the first shutter switch signal SW1, the system control unit 50 starts operations of AF (autofocus) processing, AE (auto exposure) processing, AWB (auto white balance) processing, EF (preliminary flash emission) processing, etc.

The second shutter switch 64 is turned ON and issues a second shutter switch signal SW2 upon completion of the operation performed on the shutter button 61, that is to say, in response to full-pressing of the shutter button (a shooting instruction). In response to the second shutter switch signal SW2, the system control unit 50 starts operations of a sequence of shooting processing, from readout of signals from the image capturing unit 22 to writing of image data to the recording medium 200.

For example, selecting and operating various types of function icons displayed on the display unit 28 allocate appropriate functions to the operation members of the operation unit 70 on a scene-by-scene basis, and cause the operation members to act as various types of function buttons. Examples of the function buttons include a stop button, a return button, an image switch button, a jump button, a narrow-down button, an attribute change button, etc. For example, in response to pressing of a menu button, the display unit 28 displays a menu screen on which various types of settings can be configured. The user can intuitively configure various types of settings using the menu screen displayed on the display unit 28, the four-directional button including the upper, lower, left, and right portions, and the SET button.

The operation unit 70 represents various types of operation members as an input unit that accepts operations from the user. The operation unit 70 includes at least the following operation units: the shutter button 61, the main electronic dial 71, the power switch 72, the sub-electronic dial 73, the crisscross key 74, the SET button 75, the LV button 76, the enlarge button 77, the reduce button 78, and the reproduction button 79.

A power control unit 80 is composed of a battery detection circuit, a DC-DC converter, a switch circuit that switches a block to which current is to be supplied, and the like, and detects whether a battery is installed, the type of the battery, and the remaining battery level. The power control unit 80 also controls the DC-DC converter based on the result of the detection and on an instruction from the system control unit 50, and supplies necessary voltage to various components, including the recording medium 200, for a necessary amount of time.

A power unit 30 is constituted by, for example, a primary battery (e.g., an alkaline battery and a lithium battery), a secondary battery (e.g., a NiCd battery, a NiMH battery, and a Li-ion battery), or an AC adaptor. A recording medium I/F 18 is an interface for the recording medium 200, examples of which include a memory card and a hard disk. The recording medium 200 is a recording medium (e.g., a memory card) for recording shot images, and is constituted by a semiconductor memory, a magnetic disk, and the like.

A communication unit 54 is connected to an external device wirelessly or via a wired cable, and transmits and receives video signals and audio signals. The communication unit 54 can also be connected to a wireless LAN (Local Area Network) and the Internet. The communication unit 54 can transmit images captured by the image capturing unit 22 (including through-the-lens images) and images recorded in the recording medium 200, and receive image data and other various types of information from an external device.

An orientation detection unit 55 detects an orientation of the digital camera 100 relative to the direction of gravity. Based on the orientation detected by the orientation detection unit 55, it is possible to discriminate whether an image shot by the image capturing unit 22 is an image shot with the digital camera 100 held in a landscape orientation, or an image shot with the digital camera held in a portrait orientation. The system control unit 50 can append directional information corresponding to the orientation detected by the orientation detection unit 55 to an image file of an image captured by the image capturing unit 22, and record an image in a rotated state. For example, an acceleration sensor or a gyroscope can be used as the orientation detection unit 55.

Note that the operation unit 70 includes a touch panel that can detect contact with the display unit 28. The touch panel and the display unit 28 can be configured integrally. For example, the touch panel is configured such that the light transmittance does not obstruct display performed by the display unit 28, and is attached to an upper layer of a display surface of the display unit 28. Then, the input coordinates on the touch panel are associated with the display coordinates on the display unit 28. In this way, a GUI (graphical user interface) can be configured that enables the user to directly operate a screen displayed on the display unit 28. The system control unit 50 can detect the following operations and states on the touch panel.

Newly touching the touch panel with a finger or stylus from a state where the finger or stylus was not touching the touch panel. In other words, a start of a touch (hereinafter referred to as a touch-down).

A state where a finger or stylus is touching the touch panel (hereinafter referred to as a touch-on).

Moving a finger or stylus while it is touching the touch panel (hereinafter referred to as a touch-move).

Releasing a finger or stylus from the touch panel from a state where the finger or stylus was touching the touch panel. In other words, an end of a touch (hereinafter referred to as a touch-up).

A state where nothing is touching the touch panel (hereinafter referred to as a touch-off).

When a touch-down is detected, a touch-on is also detected simultaneously. Normally, after a touch-down, a touch-on is continuously detected unless a touch-up is detected. A touch-move is detected also in a state where a touch-on is being detected. Even if a touch-on is being detected, a touch-move is not detected unless a touch position is moving. A touch-off is detected after detection of a touch-up whereby every finger or stylus is released from the touch panel from a state where the finger or stylus was touching the touch panel.

The system control unit 50 is notified of these operations and states, as well as the position coordinates on which a finger or stylus is touching the touch panel, via an internal bus. The system control unit 50 determines what kind of operation (touch operation) has been performed on the touch panel based on information it has been notified of. Regarding a touch-move, the moving direction of a finger or stylus moving on the touch panel can also be determined for each vertical component and each horizontal component on the touch panel based on changes in the position coordinates. The system control unit 50 determines that a slide operation (a drag) has been performed when a touch-move of a predetermined distance or longer is detected. An operation of releasing a finger from the touch panel immediately after quickly moving the finger by a certain distance while the finger is touching the touch panel is called a flick. In other words, a flick is an operation of quickly running a finger on the touch panel in a flicking motion. It can be determined that a flick has been performed (it can be determined that a flock has been performed following a drag) when a touch-up is detected immediately after detection of a touch-move of a predetermined distance or longer at a predetermined speed or higher. Furthermore, a touch operation of bringing touched positions close to each other and a touch operation of distancing the touched positions from each other while simultaneously touching a plurality of locations (e.g., two points) are referred to as a pinch-in and a pinch-out, respectively. The pinch-out and the pinch-in are collectively referred to as a pinch operation (or simply a pinch). Any one of touch panels of various types, including a resistive film type, a capacitance type, a surface acoustic wave type, an infrared type, an electromagnetic induction type, an image recognition type, and an optical sensor type, may be used as the touch panel. There are types that detect a touch in response to contact with the touch panel, and types that detect a touch when a finger or stylus approaches the touch panel; either of them may be used.

The digital camera 100 can perform shooting in the diorama mode. The diorama mode is a shooting mode that generates an image by applying blur processing through image processing by the image processing unit 24 to a range excluding a part of a shot image (an inner portion of a later-described diorama frame), and records the generated image. When a vast landscape and the like have been shot, an image exhibits defocus that is more intense than optically-obtained defocus and defocus in a background and a foreground; therefore, it is possible to obtain an image giving the impression that near distance shooting (closeup shooting, macro shooting) of a diorama made of miniatures has been performed. Accordingly, when, for example, a landscape with an actual running train has been shot, it is possible to obtain an image giving the impression that a model of a train is running.

When shooting is performed in the diorama mode, the image processing unit 24 applies the blur processing to the outside of the diorama frame through the image processing. Thus, even if an in-focus state is achieved by performing AF outside the diorama frame (a region other than a non-blur region), a position at which AF has been performed shows a defocused image. In this case, if the inside of the diorama frame is optically defocused, the entire image is defocused as a result and becomes a failed photograph. Therefore, basically, in the diorama mode, it is desirable to perform AF in a range inside the diorama frame in which the blur processing is not executed. Meanwhile, there are cases in which it is difficult to bring a subject inside the diorama frame into focus even if AF is performed due to, for example, significantly low contrast, significant darkness, and difficulty in distinguishing between a main subject and a background because of the presence of a cage and a fence. In these cases, the subject to be focused on inside the diorama frame is also brought into focus by performing shooting with AF on a subject that is outside the diorama frame, at the approximately same subject distance as the subject to be focused on inside the diorama frame, and is easily brought into focus by AF. In these cases, it is sufficient for the user to deliberately set an AF position (AF frame) in coordination with the subject outside the diorama frame; however, if the AF frame is accidentally set outside the diorama frame without considering the subject distance inside the diorama frame, there is a possibility that the aforementioned failed photograph is generated. In view of this, the present embodiment will be described in relation to control for reducing the possibility that the user accidentally sets the AF frame outside the diorama frame, while still enabling the AF frame to be set outside the diorama frame.

Figure 3A:
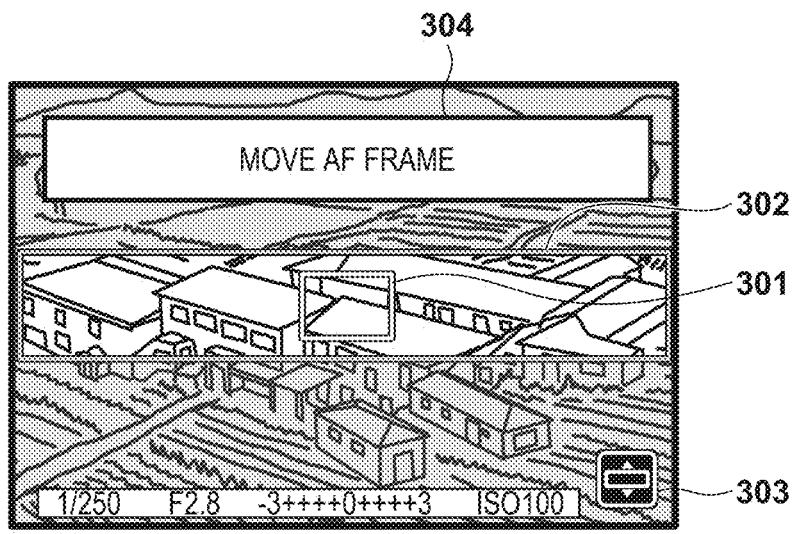
FIGS. 3A and 3B are diagrams showing an AF frame setting screen.
Figure 3B:
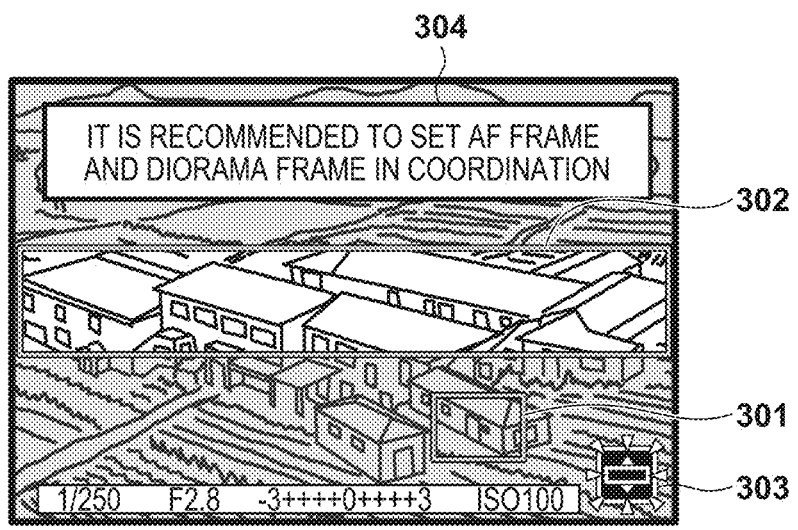

FIGS. 3A and 3B are diagrams showing an AF frame setting screen that is displayed on the display unit 28 of the digital camera 100. In FIGS. 3A and 3B, a background image is a live-view image (LV image). FIG. 3A shows an initial state of the AF frame setting screen. When the digital camera 100 enters the diorama mode, this screen is displayed first. FIG. 3B shows the AF frame setting screen in a case where the AF frame has moved to the outside of the diorama frame. The user can set the AF frame (set a focus detection region) using the AF frame setting screen.

In the figures, reference sign 301 denotes the AF frame as a display element that indicates a focus detection region in which focus detection is performed. The AF frame 301 can be moved up, down, left, and right using the crisscross key 74 (directional key). Furthermore, the AF frame 301 can also be moved to a region that has been touched inside the screen via the touch panel. Reference sign 302 denotes the diorama frame as a display element that indicates a non-blur region in which the blur processing is not executed. The specifics of the diorama frame 302 will be described later using FIGS. 4A and 4B. Reference sign 303 denotes a touch button (display item) for making a transition to a diorama frame setting screen. Note that it is also possible to make a transition to a diorama effect setting screen through a key operation (e.g., an operation on the enlarge button 77) besides the touch button 303. A display state of the touch button 303 is switched depending on a positional relationship between the diorama frame 302 and the AF frame 301. For example, as shown in FIG. 3B, the touch button 303 flashes when the AF frame 301 has strayed from the diorama frame 302. This makes it easy for the user to recognize that the AF position is outside the diorama frame 302. Note that besides flashing, the display appearance of the touch button 303 may be changed in other ways; for example, the color may be changed, a mark may be appended, and the thickness of a button frame may be changed. The specifics of a positional relationship between the diorama frame 302 and the AF frame 301 will be described later using FIGS. 5A to 5C. Furthermore, when the AF frame 301 falls inside the diorama frame 302, the color(s) of one or both of the AF frame 301 and the diorama frame 302 can be changed. Note that besides changing of the color(s) of at least one of the AF frame 301 and the diorama frame 302, the display appearances may be changed in other ways; for example, they may flash/light up, a mark may be appended, and the thickness of the button frame may be changed. Reference sign 304 denotes a region in which a message is displayed (a message region). For example, the message region 304 is used to display a message suggesting the movement of the AF frame 301 (FIG. 3A), a warning message indicating that the AF frame 301 has strayed from the diorama frame 302 (FIG. 3B), etc.

Figure 4A:
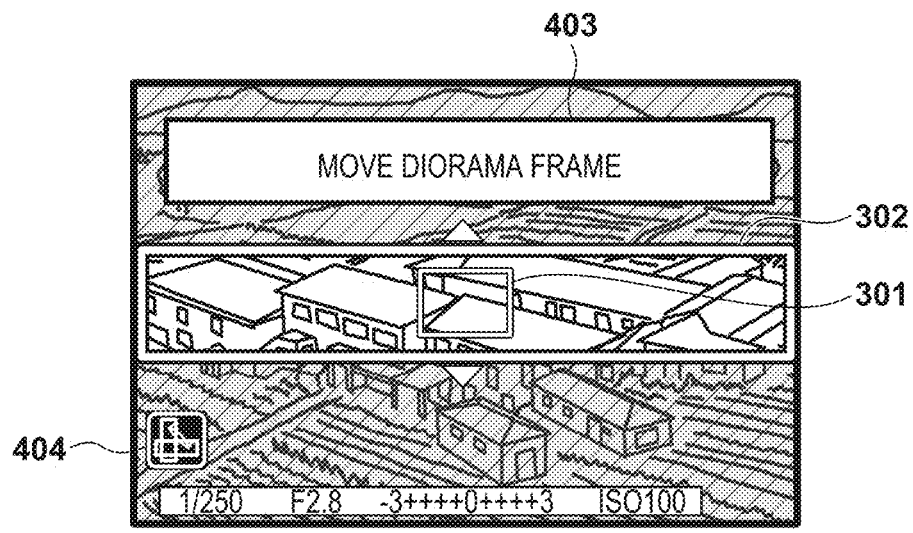
FIGS. 4A and 4B are diagrams showing a diorama frame setting screen.
Figure 4B:
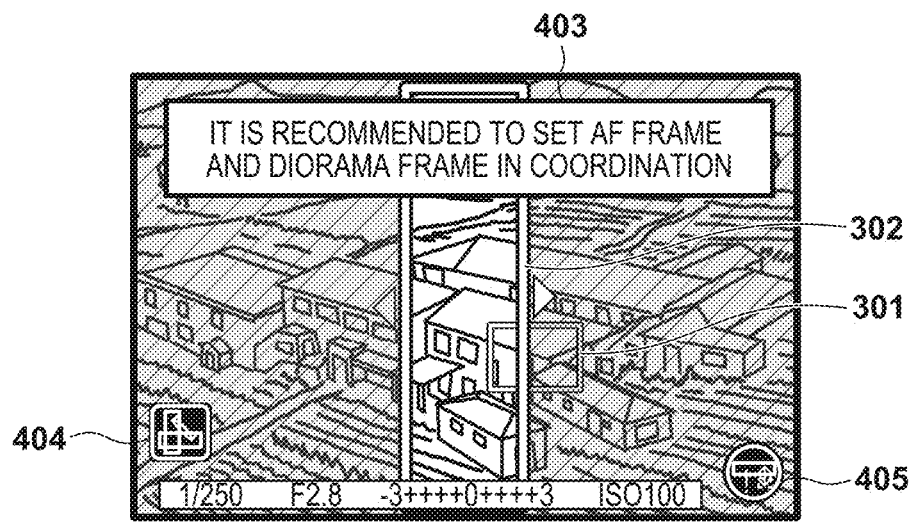

FIGS. 4A and 4B are diagrams showing the diorama frame setting screen that is displayed on the display unit 28 of the digital camera 100. In FIGS. 4A and 4B, a background image is an LV image. In FIGS. 4A and 4B, constituent elements that are the same as or similar to those in FIGS. 3A and 3B are given the same reference signs as in FIGS. 3A and 3B. The diorama frame setting screen is displayed in response to an operation on the touch button 303 in FIG. 3A. FIG. 4A shows the diorama frame setting screen in a state where the diorama frame 302 is set horizontally with respect to the screen. FIG. 4B shows the diorama frame setting screen in a case where the diorama frame 302 is set vertically with respect to the screen. The user can set the diorama frame (set the non-blur region) using the diorama frame setting screen.

Switching between FIG. 4A and FIG. 4B can be performed by a touch operation on a vertical/horizontal switch button 404. Note that this switching can be performed by a key operation (e.g., an operation on the enlarge button 77) besides the vertical/horizontal switch button 404.

As the position of the AF frame 301 on the diorama frame setting screen, the position set on the AF frame setting screen in FIGS. 3A and 3B is taken over as-is. The diorama frame 302 indicates a region that is clearly presented, that is to say, a region to which the blur effect is not applied. A region outside the diorama frame 302 is a region to which the blur effect is applied. In FIGS. 4A and 4B, filling of the region outside the diorama frame 302 with gray means that the blur effect has been applied thereto. Furthermore, in the present embodiment, in addition to the blur effect, a semi-transmissive black mask (a mask of a semi-transmissive color) is applied to the region outside the diorama frame 302 (indicated by oblique lines in FIGS. 4A and 4B). This makes it easy to inform the user of the region to which the blur effect is applied. In other words, the inside and the outside of the diorama frame 302 are rendered identifiable and visually recognizable on the screen. The digital camera 100 may automatically adjust (change) the color of the mask applied to the region outside the diorama frame 302 in accordance with at least one of the hue, brightness, and saturation of the LV image. Furthermore, when the AF frame 301 exists in the region to which the blur effect is applied (outside the diorama frame 302), the color of a part of the AF frame 301 that overlaps the region to which the blur effect is applied is gray due to blending with the color of the mask. This makes the user notice that the positions of the diorama frame 302 and the AF frame 301 are supposed to be coordinated with each other as a general rule.

Furthermore, in a state where the diorama frame 302 and the AF frame 301 do not completely overlap each other as shown in FIG. 4B, a warning icon 405 is displayed. This warning icon 405 can flash when displayed so as to be noticed by the user. A message region 403 is a region in which a guide message is displayed. For example, the message region 403 is used to display a message suggesting the movement of the diorama frame 302 (FIG. 4A), a warning message indicating that the diorama frame 302 and the AF frame 301 do not overlap each other (FIG. 4B), etc.

Figure 5A:
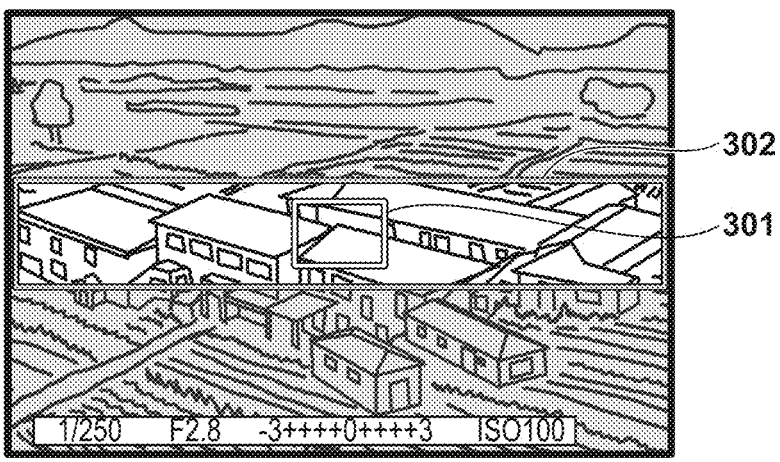
FIGS. 5A to 5C are diagrams for describing conditions for determining whether a diorama frame 302 and an AF frame 301 overlap each other.
Figure 5B:
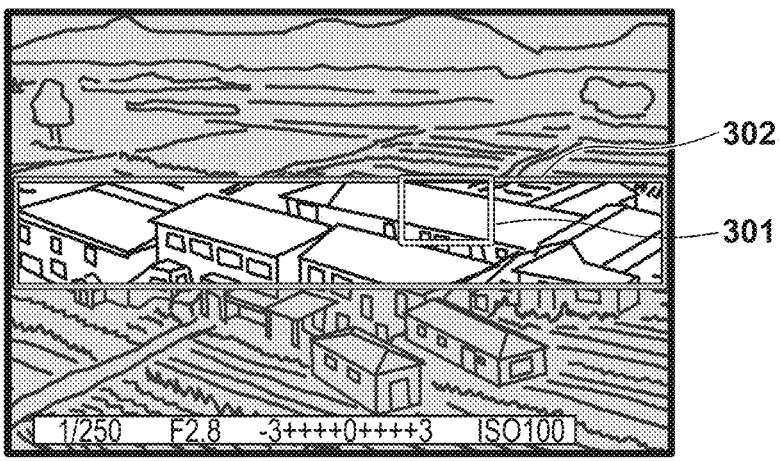
Figure 5C:
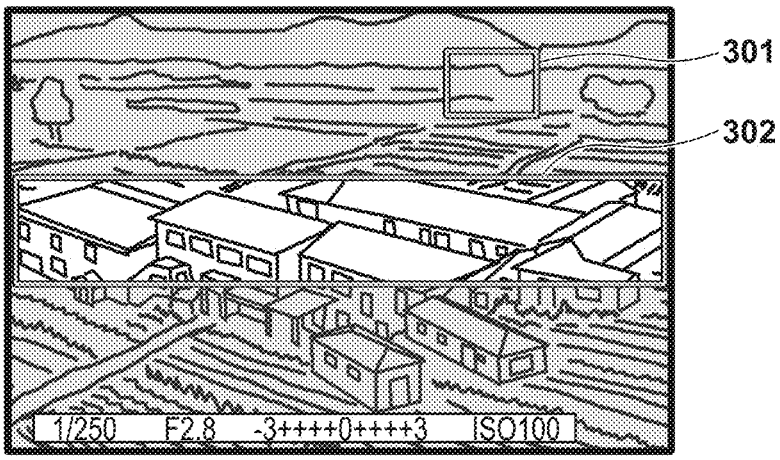

FIGS. 5A to 5C are diagrams for describing conditions for determining whether the diorama frame 302 and the AF frame 301 overlap each other based on a positional relationship between the two frames. In FIGS. 5A to 5C, constituent elements that are the same as or similar to those in FIGS. 3A and 3B are given the same reference signs as in FIGS. 3A and 3B. In FIG. 5A, the AF frame 301 falls inside the diorama frame 302. In this case, it is determined that the two frames overlap each other (the AF frame 301 is inside the diorama frame 302). In FIG. 5B, the AF frame 301 is straying from the diorama frame 302. In this case, it is determined that the two frames do not overlap each other (the AF frame 301 is outside the diorama frame 302). Note that although it is determined in the present embodiment that the two frames do not overlap each other if the AF frame 301 strays from the diorama frame 302 even by one dot, a threshold for this determination may be changed based on some kind of condition. In FIG. 5C, the AF frame 301 is completely outside the diorama frame 302. In this case, it is determined that the two frames do not overlap each other.

Figure 6A:
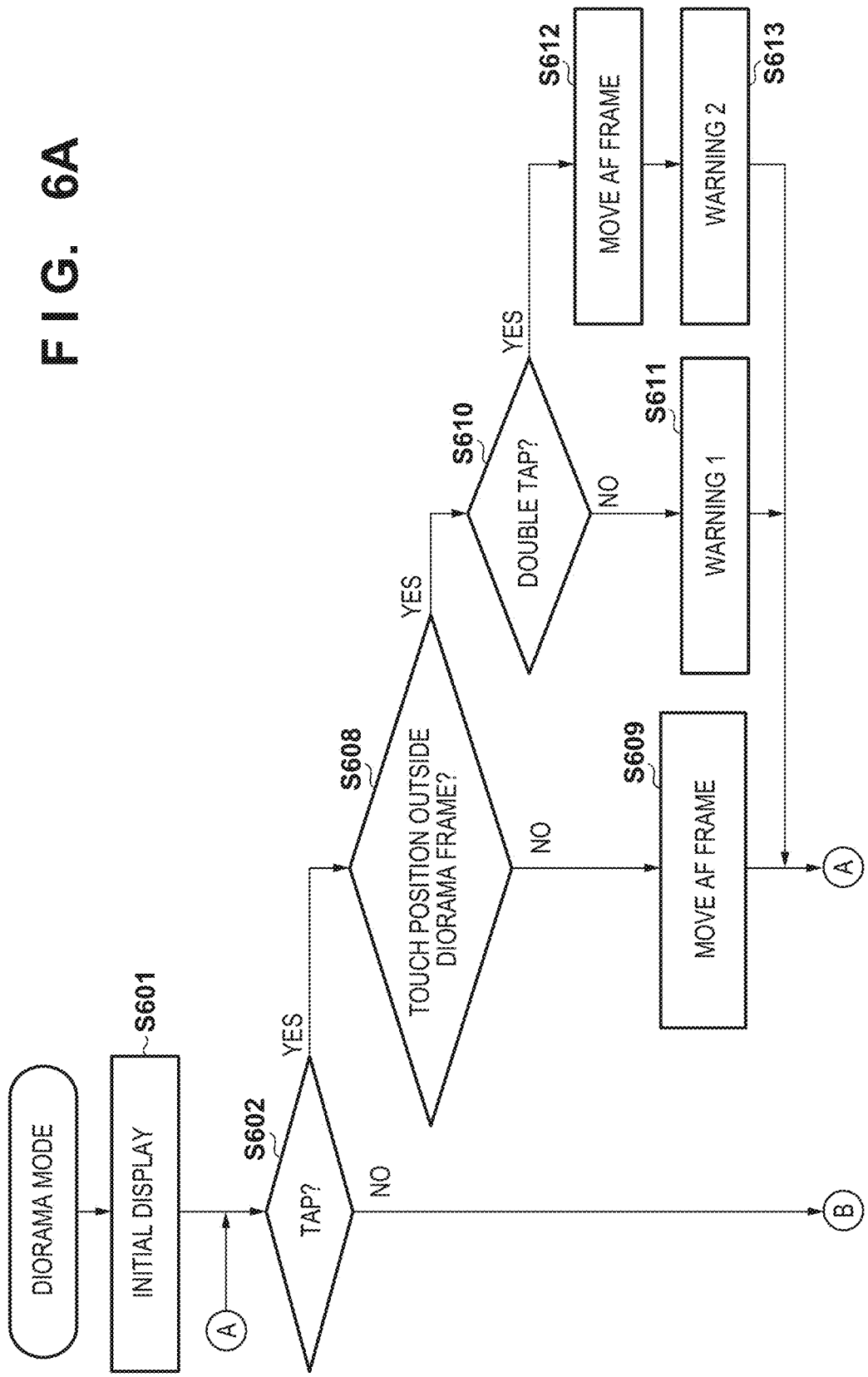
FIGS. 6A and 6B are flowcharts of processing of a diorama mode.
Figure 6B:
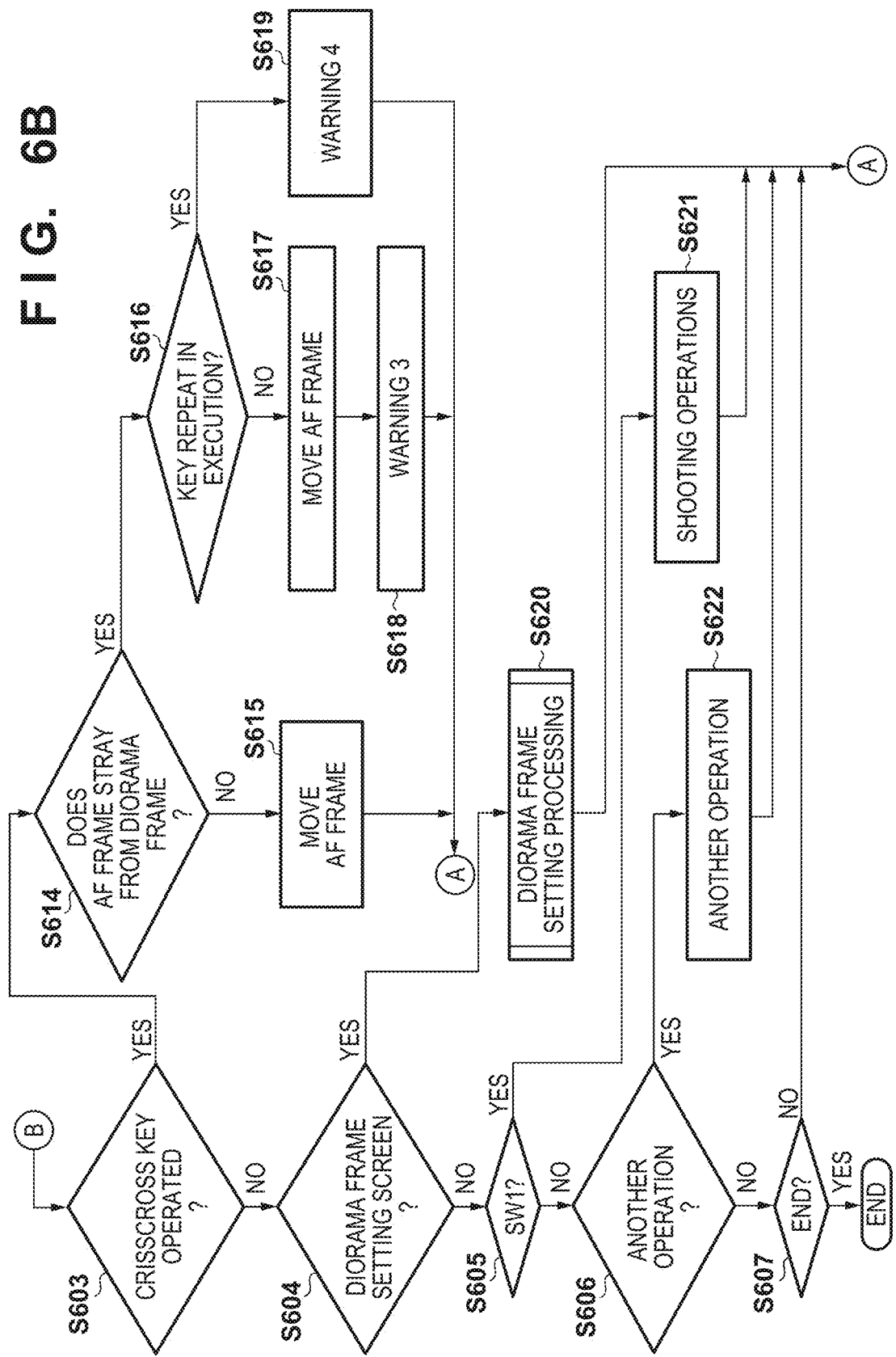

FIGS. 6A and 6B are flowcharts of processing of the diorama mode. The process of each step in the present flowchart is realized as the system control unit 50 deploys a program stored in the non-volatile memory 56 to the system memory 52 and executes the deployed program, unless specifically stated otherwise. The processing of the present flowchart starts when the digital camera 100 is set to the diorama mode by, for example, a user's operation on the mode change switch 60.

In step S601, the system control unit 50 performs initial display of the diorama mode (FIG. 3A). In step S602, the system control unit 50 determines whether a tap has been performed on a position where an LV image is displayed on the display unit 28 excluding, for example, the region of the touch button 303. A tap denotes an operation of performing a touch-down and a touch-up successively in a short amount of time. Here, the tap is an operation for moving the AF frame 301 on the screen (a focus detection region moving operation). If the tap has been performed, the processing proceeds to step S608; otherwise, the processing proceeds to step S603.

In step S608, the system control unit 50 determines whether a tap position in step S602 is outside the diorama frame 302. If the tap position is outside the diorama frame 302, the processing proceeds to step S610; otherwise, the processing proceeds to step S609.

In step S609, the system control unit 50 moves the AF frame 301 to the tap position in step S602. Thereafter, the processing returns to step S602.

Figure 8A:
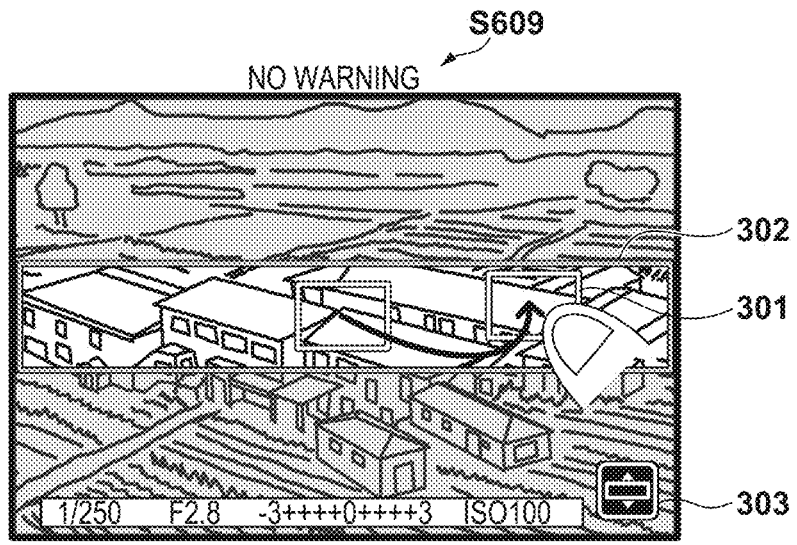
FIG. 8A is a diagram showing an example of display performed by a display unit 28 of the digital camera 100 in step S609.

FIG. 8A shows an example of display performed by the display unit 28 of the digital camera 100 in step S609. In FIG. 8A, a background image is an LV image. In FIG. 8A, constituent elements that are the same as or similar to those in FIGS. 3A and 3B are given the same reference signs as in FIGS. 3A and 3B. When the user has moved the AF frame 301 inside the diorama frame 302 by performing a tap, a warning is not displayed.

In step S610, the system control unit 50 determines whether a tap has been performed again within a certain period since the tap in step S602. Performing a tap (single tap) twice in a row within a certain period is called a double tap. If the double tap has been performed, the processing proceeds to step S612; otherwise, the processing proceeds to step S611.

In step S611, the system control unit 50 gives a warning to inform the user of the failure to move the AF frame 301. Here, the warning is, for example, a message indicating "AF frame cannot be moved to the outside of diorama frame," or "please set AF frame inside diorama frame." Thereafter, the processing returns to step S602.

Figure 8B:
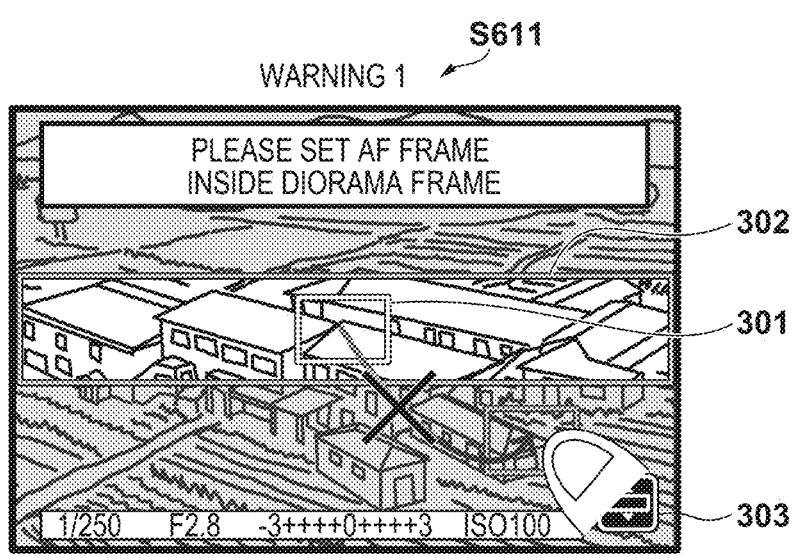
FIG. 8B is a diagram showing an example of display performed by the display unit 28 of the digital camera 100 in step S611.

FIG. 8B shows an example of display performed by the display unit 28 of the digital camera 100 in step S611. In FIG. 8B, a background image is an LV image. In FIG. 8B, constituent elements that are the same as or similar to those in FIGS. 3A and 3B are given the same reference signs as in FIGS. 3A and 3B. When the user has made an attempt to move the AF frame 301 to the outside of the diorama frame 302 by performing a tap, the AF frame 301 is not moved, and a warning is displayed.

In step S612, the system control unit 50 moves the AF frame 301 to the tap position in step S602.

In step S613, the system control unit 50 gives a warning to inform the user of the fact that the AF frame 301 has been set outside the diorama frame 302. Here, the warning is a message indicating, for example, "AF frame is set outside diorama frame," "in-focus position is different from position to which blur effect is not applied," or "blur processing is applied to in-focus position." The warning may be given by causing an icon (e.g., the touch button 303) to flash instead of, or in addition to, display of the message. Thereafter, the processing returns to step S602.

Figure 8C:
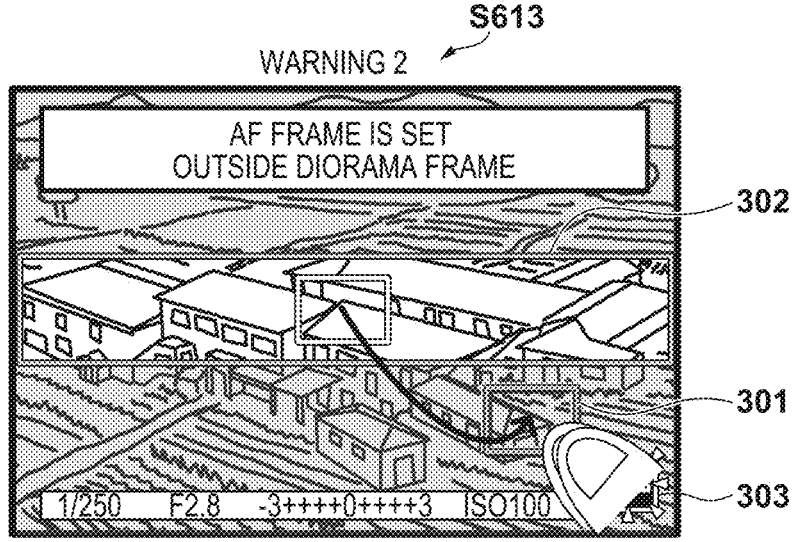
FIG. 8C is a diagram showing an example of display performed by the display unit 28 of the digital camera 100 in step S613.

FIG. 8C shows an example of display performed by the display unit 28 of the digital camera 100 in step S613. In FIG. 8C, a background image is an LV image. In FIG. 8C, constituent elements that are the same as or similar to those in FIGS. 3A and 3B are given the same reference signs as in FIGS. 3A and 3B. When the user has moved the AF frame 301 to the outside of the diorama frame 302 by performing a double tap, a warning is displayed. Note that an operation that can move the AF frame 301 to the outside of the diorama frame 302 is not limited to a double tap. For example, such an operation may be a long touch (a touch operation of performing a touch continuously for a predetermined period or longer without moving a touch position), a touch-down with a moderately high touch pressure in the case of a device that can detect a touch pressure, etc.

If the tap has not been performed in step S602, the system control unit 50 determines whether the crisscross key 74 has been operated in step S603. Here, the operation on the crisscross key 74 is to move the AF frame 301 on the screen. If the crisscross key 74 has been operated, the processing proceeds to step S614; otherwise, the processing proceeds to step S604.

In step S614, the system control unit 50 determines whether the current position of the AF frame 301 is a position inscribed in the diorama frame 302 and the AF frame 301 strays from the diorama frame 302 if the AF frame 301 moves in the direction of the operation on the crisscross key 74 in step S603. If the AF frame 301 strays from the diorama frame 302, the processing proceeds to step S616; otherwise, the processing proceeds to step S615.

In step S615, the system control unit 50 moves the AF frame 301 in the direction of the operation on the crisscross key 74 in step S603. Thereafter, the processing returns to step S602.

Figure 9A:
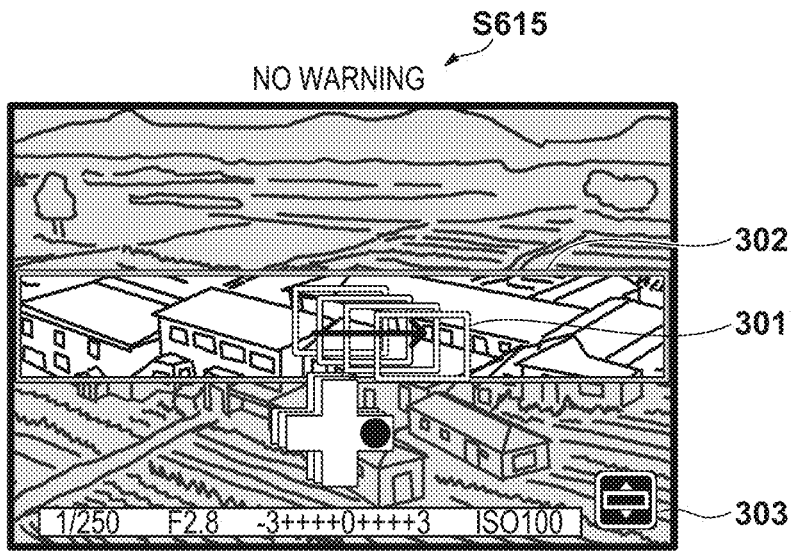
FIG. 9A is a diagram showing an example of display performed by the display unit 28 of the digital camera 100 in step S615.

FIG. 9A shows an example of display performed by the display unit 28 of the digital camera 100 in step S615. In FIG. 9A, a background image is an LV image. In FIG. 9A, constituent elements that are the same as or similar to those in FIGS. 3A and 3B are given the same reference signs as in FIGS. 3A and 3B. When the user has moved the AF frame 301 inside the diorama frame 302 by operating the crisscross key 74, a warning is not displayed.

In step S616, the system control unit 50 determines whether a key repeat is in execution. If the key repeat is not in execution, the processing proceeds to step S617; if the key repeat is in execution, the processing proceeds to step S619. A key repeat denotes a state where an input command is issued in a predetermined cycle as long as an operation on (pressing of) the crisscross key 74 in a specific direction being continued due to continuation of the operation (pressing) for a predetermined period (i.e., the crisscross key 74 is being operated successively in the same direction). Note that even during the key repeat, the processing proceeds from step S614 to step S615 until the AF frame 301 is inscribed in the diorama frame 302. Therefore, the user can move the AF frame 301 successively in a specific direction until the AF frame 301 is inscribed in the diorama frame 302 by performing a key repeat (i.e., by keeping pushing the crisscross key 74 in the specific direction).

In step S617, the system control unit 50 moves the AF frame 301 in accordance with the direction of the operation on the crisscross key 74 in step S603.

In step S618, the system control unit 50 gives a warning to notify the user of the fact that the AF frame 301 is set outside the diorama frame 302. Here, the warning is a message indicating, for example, "AF frame is set outside diorama frame," "in-focus position is different from position to which blur effect is not applied," or "blur processing is applied to in-focus position." The warning may be given by causing an icon (e.g., the touch button 303) to flash instead of, or in addition to, display of the message. Note that the warning displayed in step S618 may be the same as the warning in the above-described step S613. Thereafter, the processing returns to step S602.

Figure 9B:
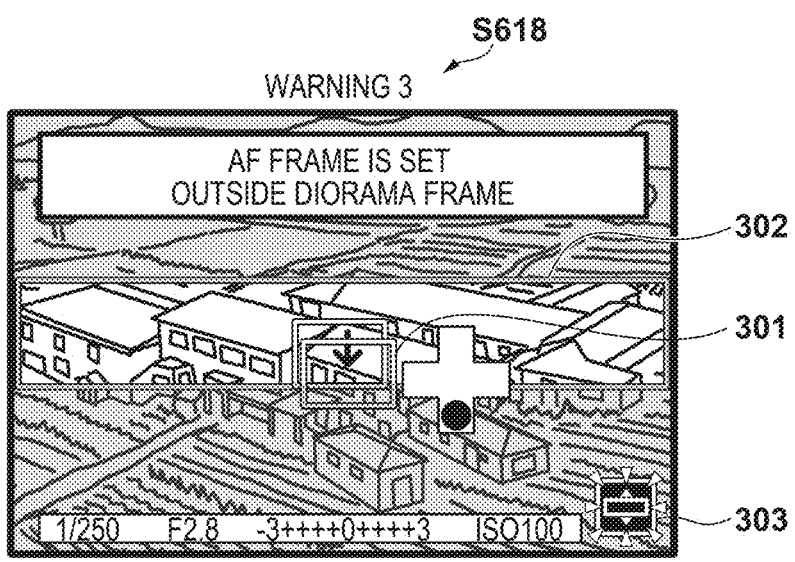
FIG. 9B is a diagram showing an example of display performed by the display unit 28 of the digital camera 100 in step S618.

FIG. 9B shows an example of display performed by the display unit 28 of the digital camera 100 in step S618. In FIG. 9B, a background image is an LV image. In FIG. 9B, constituent elements that are the same as or similar to those in FIGS. 3A and 3B are given the same reference signs as in FIGS. 3A and 3B. When the user has moved the AF frame 301 to the outside of the diorama frame 302 by operating the crisscross key 74 without performing a key repeat, a warning is displayed. Note that an operation that can move the AF frame 301 to the outside of the diorama frame 302 is not limited to a double tap, and may be, for example, a long touch, a touch-down with a moderately high touch pressure, etc.

In step S619, the system control unit 50 gives a warning to notify the user of the fact that the AF frame 301 cannot be moved to the outside of the diorama frame 302 during the key repeat. Here, the warning is, for example, a message indicating "AF frame cannot be moved to the outside of diorama frame during key repeat," or "please stop key repeat." Thereafter, the processing returns to step S602.

Figure 9C:
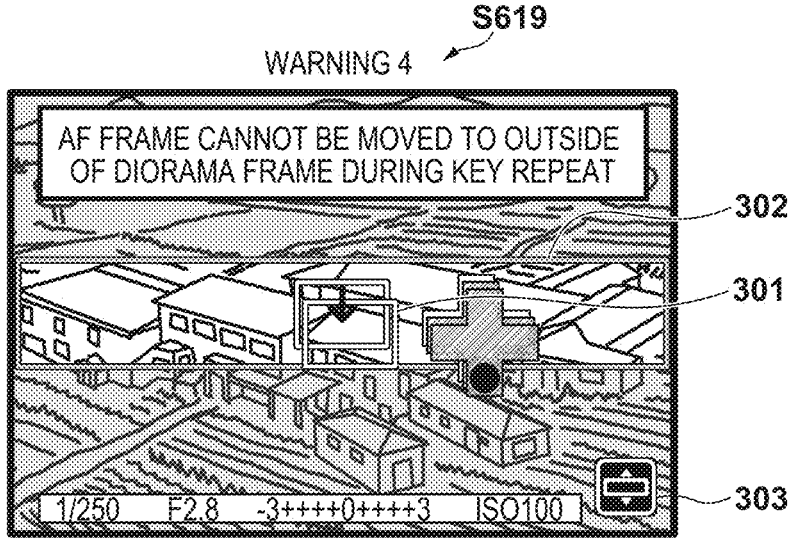
FIG. 9C is a diagram showing an example of display performed by the display unit 28 of the digital camera 100 in step S619.

FIG. 9C shows an example of display performed by the display unit 28 of the digital camera 100 in step S619. In FIG. 9C, a background image is an LV image. In FIG. 9C, constituent elements that are the same as or similar to those in FIGS. 3A and 3B are given the same reference signs as in FIGS. 3A and 3B. When the user has made an attempt to move the AF frame 301 to the outside of the diorama frame 302 by performing a key repeat, the AF frame 301 is moved only to a border of the diorama frame 302, and a warning is displayed.

If the crisscross key 74 has not been operated in step S603, the system control unit 50 determines whether an operation to make a transition to the diorama frame setting screen has been performed in step S604. The operation to make a transition to the diorama frame setting screen can be performed using the touch button 303 shown in FIGS. 3A and 3B. If the operation to make the transition has been performed, the processing proceeds to step S620; if the operation to make the transition has not been performed, the processing proceeds to step S605.

In step S620, the system control unit 50 makes a transition from the AF frame setting screen to the diorama frame setting screen, and executes diorama frame setting processing. The specifics of the diorama frame setting processing will be described later with reference to FIG. 7.

In step S605, the system control unit 50 determines whether an operation for SW1 (half-pressing of the shutter button 61) has been performed. If the operation for SW1 has been performed, the processing proceeds to step S621; if the operation for SW1 has not been performed, the processing proceeds to step S606.

In step S621, the system control unit 50 executes shooting operations. In the shooting operations, the system control unit 50 performs AF in response to the operation for SW1 in accordance with a subject at the position of the set AF frame 301. Then, if SW2 has been issued (the shutter button 61 has been fully pressed), the system control unit 50 performs main shooting (image shooting for recording in the form of an image file) using the image capturing unit 22. Then, the system control unit 50 applies the blur processing to a region outside the diorama frame 302 in a captured image using the image processing unit 24, and records an image generated by application of the blur processing as an image file to the recording medium 200. Note that the generated image may be a still image, or may be a moving image. Thereafter, the processing returns to step S602.

In step S606, the system control unit 50 determines whether another operation has been performed. Here, another operation is, for example, camera setting, MENU setting, etc. If another operation has been performed, the processing proceeds to step S622; if another operation has not been performed, the processing proceeds to step S607.

In step S622, the system control unit 50 performs an operation corresponding to another operation performed in step S606.

In step S607, the system control unit 50 determines whether an ending operation has been performed. If the ending operation has been performed, the processing of the present flowchart is ended. If the ending operation has not been performed, the processing returns to step S602.

Figure 7:
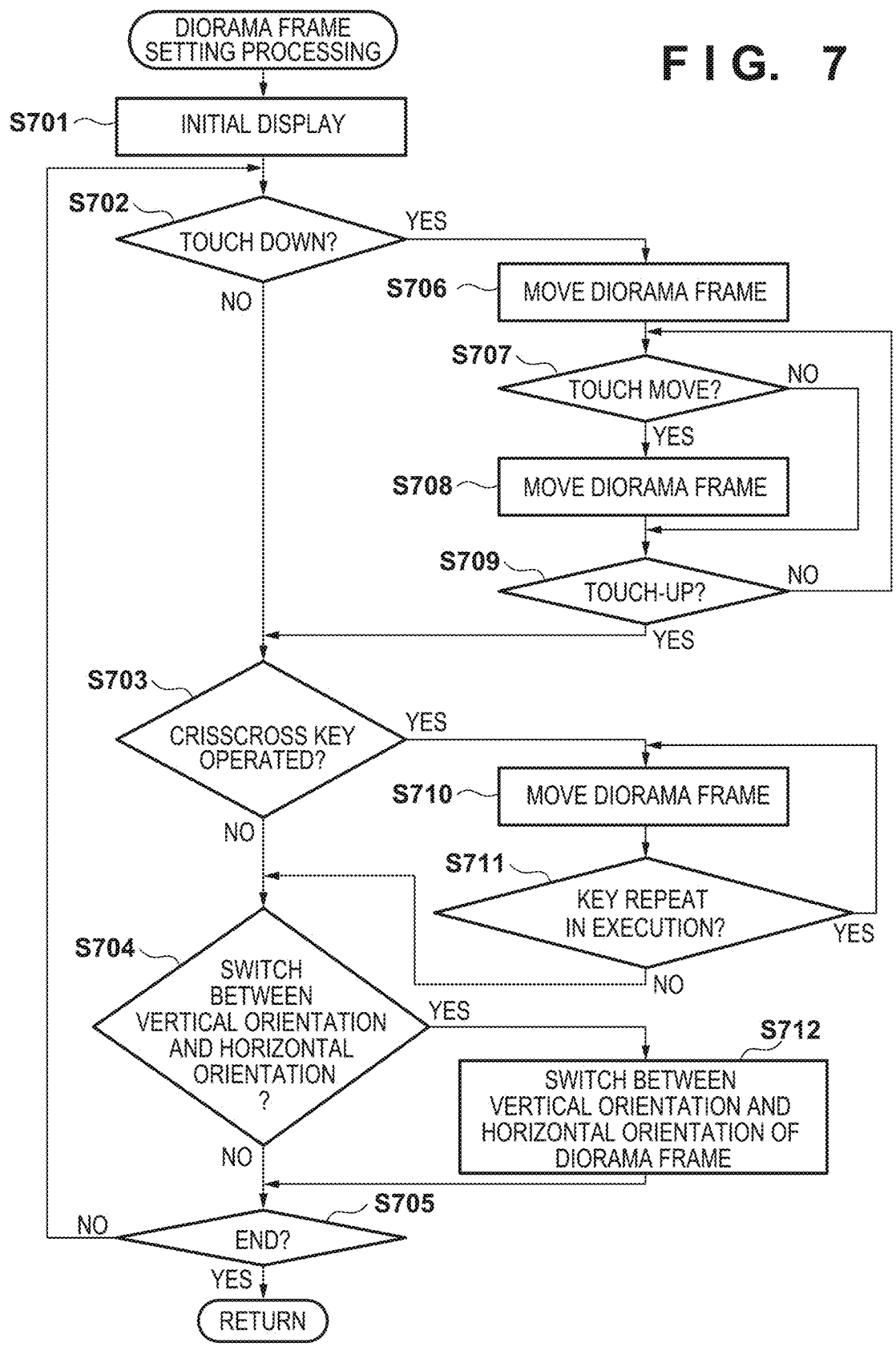
FIG. 7 is a flowchart showing the specifics of diorama frame setting processing in step S620.

FIG. 7 is a flowchart showing the specifics of the diorama frame setting processing in step S620 of FIG. 6B. The process of each step in the present flowchart is realized as the system control unit 50 deploys a program stored in the non-volatile memory 56 to the system memory 52 and executes the deployed program, unless specifically stated otherwise.

In step S701, the system control unit 50 performs initial display of the diorama frame setting screen (FIG. 4A). In step S702, the system control unit 50 determines whether a touch-down has been performed on a position where an LV image is displayed on the display unit 28 excluding, for example, the region of the vertical/horizontal switch button 404. Here, the touch-down is an operation for moving the diorama frame 302 on the screen (a non-blur region moving operation). If the touch-down has been performed, the processing proceeds to step S706; if the touch-down has not been performed, the processing proceeds to step S703.

In step S706, the system control unit 50 moves the diorama frame 302 based on the touch-down position in step S702. In step S707, the system control unit 50 determines whether a touch-move has been performed after the touch-down in step S702. If the touch-move has been performed, the processing proceeds to step S708; if the touch-move has not been performed, the processing proceeds to step S709.

In step S708, the system control unit 50 moves the diorama frame 302 based on the touch-move in step S707. When the diorama frame 302 is set horizontally with respect to the screen as shown in FIG. 4A, the system control unit 50 moves the diorama frame 302 upward or downward in accordance with a moving component of the touch position in the upward or downward direction based on the touch-move. In this case, a moving component of the touch position in the leftward or rightward direction based on the touch-move is not reflected in the movement of the diorama frame 302. On the other hand, when the diorama frame 302 is set vertically with respect to the screen as shown in FIG. 4B, the system control unit 50 moves the diorama frame 302 leftward or rightward in accordance with a moving component of the touch position in the leftward or rightward direction based on the touch-move. In this case, a moving component of the touch position in the upward or downward direction based on the touch-move is not reflected in the movement of the diorama frame 302.

In step S709, the system control unit 50 determines whether a touch-up has been performed. If the touch-up has been performed, the processing proceeds to step S703; if the touch-up has not been performed, the processing returns to step S707.

If the touch-down has not been performed in step S702, the system control unit 50 determines whether the crisscross key 74 has been operated in step S703. If the crisscross key 74 has been operated, the processing proceeds to step S710; if the crisscross key 74 has not been operated, the processing proceeds to step S704.

In step S710, the system control unit 50 moves the diorama frame 302 based on the direction of the operation on the crisscross key 74 in step S703.

In step S711, the system control unit 50 determines whether a key repeat is in execution. If the key repeat is in execution, the processing returns to step S710; otherwise, the processing proceeds to step S704.

If the crisscross key 74 has not been operated in step S703, the system control unit 50 determines whether an operation to switch between a vertical orientation and a horizontal orientation of the diorama frame 302 (e.g., a touch on the vertical/horizontal switch button 404) has been performed in step S704. If the switching between the vertical orientation and the horizontal orientation has been performed, the processing proceeds to step S712; otherwise, the processing proceeds to step S705.

In step S712, the system control unit 50 switches between the vertical orientation and the horizontal orientation of the diorama frame 302. That is to say, when the diorama frame 302 is set horizontally with respect to the screen as shown in FIG. 4A, the system control unit 50 switches to a state where the diorama frame 302 is set vertically with respect to the screen as shown in FIG. 4B. On the other hand, when the diorama frame 302 is set vertically with respect to the screen as shown in FIG. 4B, the system control unit 50 switches to a state where the diorama frame 302 is set horizontally with respect to the screen as shown in FIG. 4A.

In step S705, the system control unit 50 determines whether an ending operation has been performed. The ending operation is an operation on the return button, or an operation for making a transition to the AF frame setting screen by ending the diorama frame setting screen, such as half-pressing of the shutter button 61 (SW1). If the ending operation has been performed, the system control unit 50 ends the diorama frame setting processing, and the processing proceeds to step S602. If the ending operation has not been performed, the processing returns to step S702.

Note that although the AF frame setting screen (FIGS. 3A and 3B) is displayed as an initial screen of the diorama mode and then the diorama frame setting screen (FIGS. 4A and 4B) is displayed in response to a user operation in the foregoing example, these screens may be displayed in reverse order. That is to say, the system control unit 50 may be configured to display the diorama frame setting screen as an initial screen of the diorama mode and then display the AF frame setting screen in response to a user operation. According to this order, the user sets the AF frame 301 after setting the diorama frame 302; thus, the user sets the AF frame 301 in consideration of the diorama frame 302 that has already been set. This can further reduce the possibility of accidentally setting the AF frame 301 outside the diorama frame 302 that has already been set. In either case, both of the AF frame 301 and the diorama frame 302 are displayed simultaneously on both screens so that the user can recognize a positional relationship therebetween. By thus setting both of the AF frame 301 and the diorama frame 302 in order in the diorama mode, erroneous setting of one of the frames can be reduced.

Figure 10A:
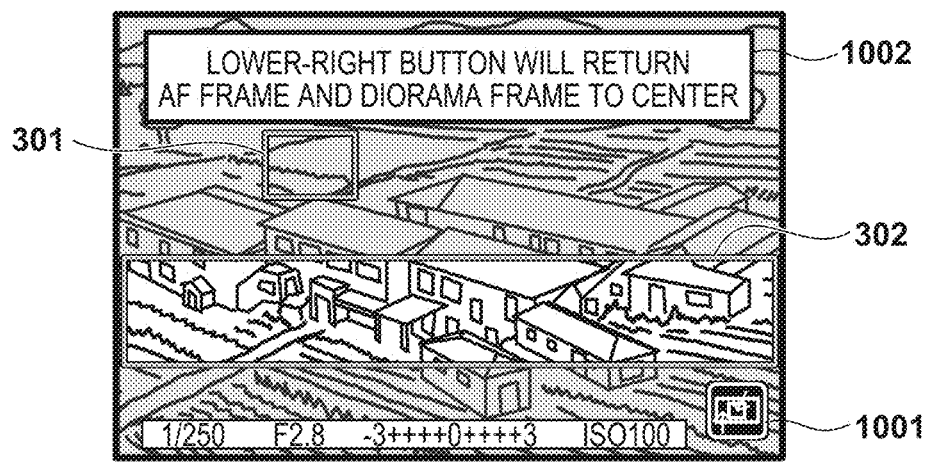
FIGS. 10A and 10B are diagrams for describing a frame reset function.
Figure 10B:
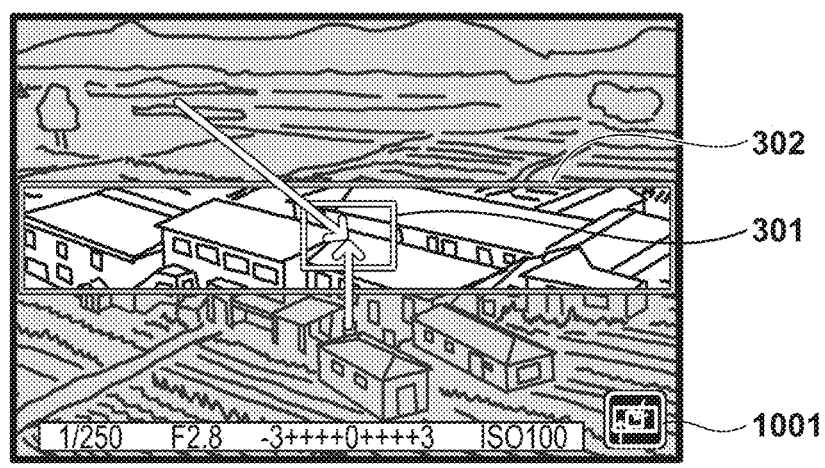

A description is now given of a frame reset function with reference to FIGS. 10A and 10B. In FIGS. 10A and 10B, a background image is an LV image. In FIGS. 10A and 10B, constituent elements that are the same as or similar to those in FIGS. 3A and 3B are given the same reference signs as in FIGS. 3A and 3B. When the AF frame 301 is outside the diorama frame 302, the system control unit 50 displays a reset button 1001 and a message 1002 on the display unit 28 as shown in FIG. 10A. The message 1002 notifies the user of the fact that the positions of the AF frame 301 and the diorama frame 302 can be reset by operating the reset button 1001. When the user has operated the reset button 1001, the system control unit 50 returns the positions of the AF frame 301 and the diorama frame 302 to the center of the screen (initial positions) (see FIG. 10B). By thus displaying a display element (e.g., the reset button 1001 or the message 1002) that suggests the user to issue an instruction for executing the frame reset function, the possibility that the user accidentally sets the AF frame 301 outside the diorama frame 302 can be reduced. Note that the initial positions of the AF frame 301 and the diorama frame 302 are not limited to the center of the screen, and may be any predetermined positions as long as the AF frame 301 is arranged inside the diorama frame 302.

Figure 10C:
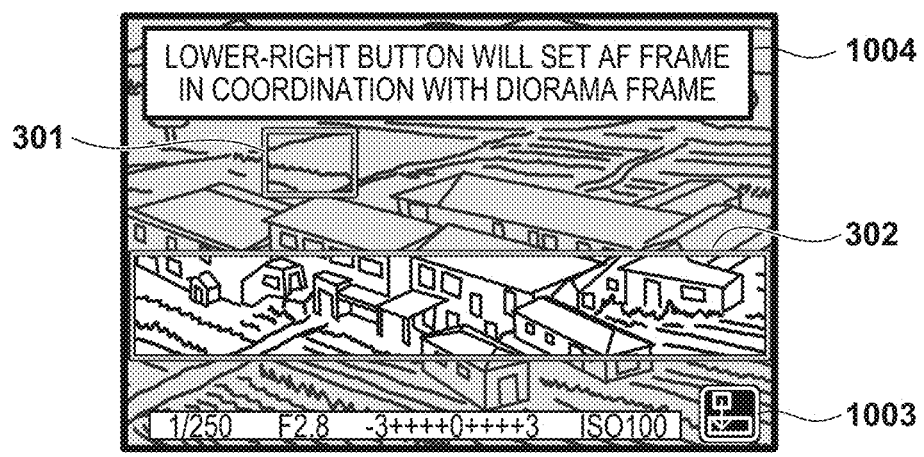
FIGS. 10C and 10D are diagrams for describing a frame coordination function.
Figure 10D:
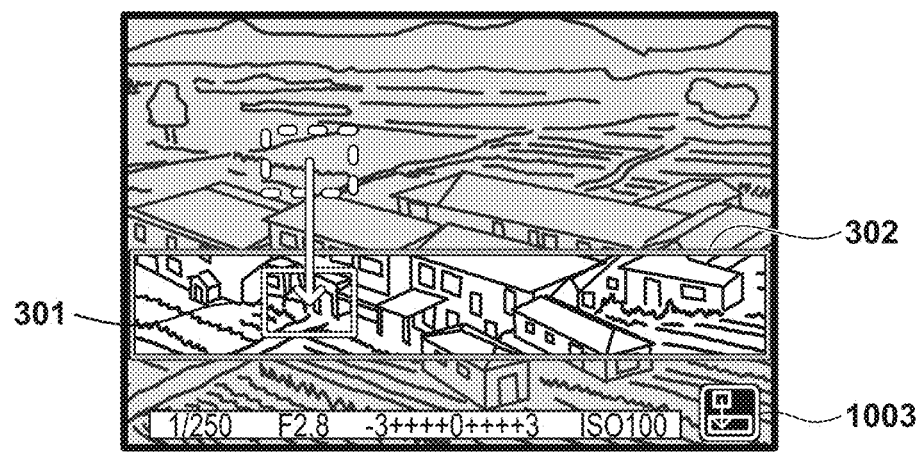

A description is now given of a frame coordination function with reference to FIGS. 10C and 10D. In FIGS. 10C and 10D, a background image is an LV image. In FIGS. 10C and 10D, constituent elements that are the same as or similar to those in FIGS. 3A and 3B are given the same reference signs as in FIGS. 3A and 3B. When the AF frame 301 is outside the diorama frame 302, the system control unit 50 displays a frame coordination button 1003 and a message 1004 on the display unit 28 as shown in FIG. 10C. The message 1004 notifies the user of the fact that the AF frame 301 will be moved to the inner side (inside) of the diorama frame 302 by operating the frame coordination button 1003. If the user operates the frame coordination button 1003 in a state where the diorama frame 302 lies in the horizontal direction, the system control unit 50 moves the AF frame 301 to the center of the Y coordinates (vertical coordinates) of the diorama frame 302 while maintaining the X coordinates (horizontal coordinates) thereof (see FIG. 10D). On the other hand, if the user operates the frame coordination button 1003 in a state where the diorama frame 302 lies in the vertical direction, the system control unit 50 moves the AF frame 301 to the center of the X coordinates (horizontal coordinates) of the diorama frame 302 while maintaining the Y coordinates (vertical coordinates) thereof (not shown). By thus displaying a display element (e.g., the frame coordination button 1003 or the message 1004) that suggests the user to issue an instruction for executing the frame coordination function, the possibility that the user accidentally sets the AF frame 301 outside the diorama frame 302 can be reduced. Note that the system control unit 50 may be configured to move the diorama frame 302 based on the position of the AF frame 301, rather than moving the AF frame 301 based on the position of the diorama frame 302. Furthermore, although it is assumed here that one of the sets of coordinates (the X coordinates or the Y coordinates) of the frame to be moved are maintained, the present embodiment is not limited in this way, and both sets of coordinates may be moved as long as the AF frame 301 falls inside the diorama frame 302.

Figure 11A:
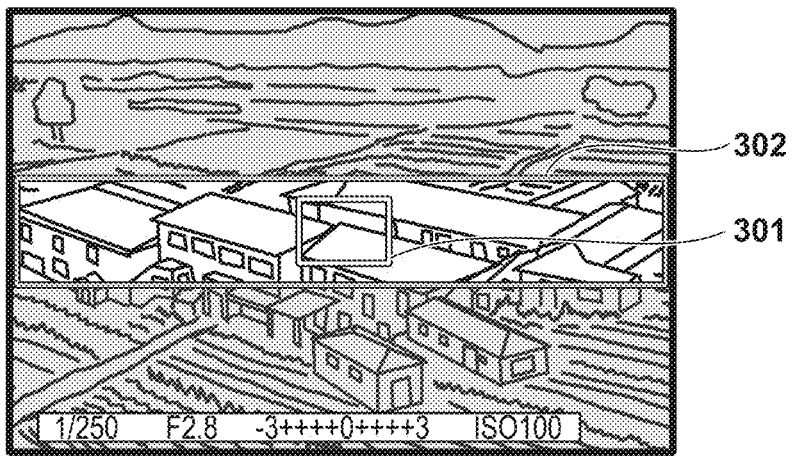
FIGS. 11A to 11C are diagrams for describing a frame tracking mode.
Figure 11B:
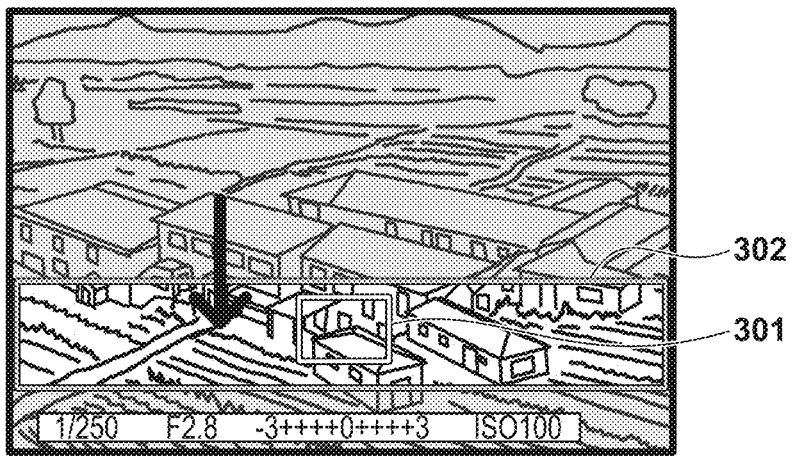
Figure 11C:
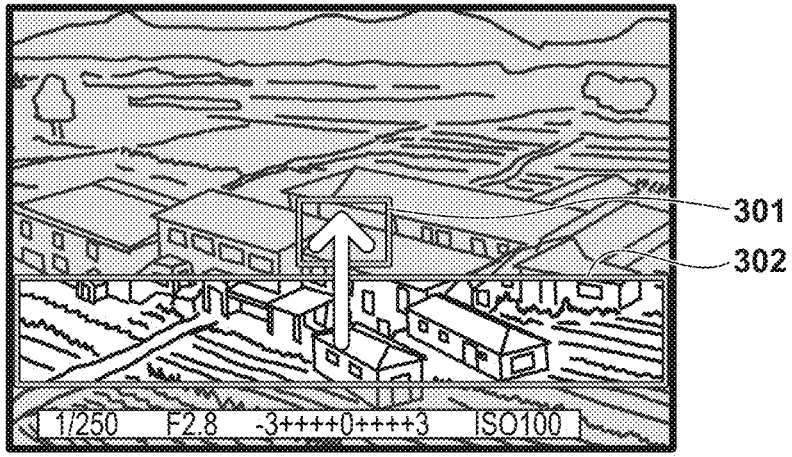

With reference to FIGS. 11A to 11C, the following describes a frame tracking mode that can be executed in combination with the foregoing embodiment. In FIGS. 11A to 11C, a background image is an LV image. In FIGS. 11A to 11C, constituent elements that are the same as or similar to those in FIGS. 3A and 3B are given the same reference signs as in FIGS. 3A and 3B. When a predetermined condition has been satisfied (e.g., the user has operated a predetermined key included in the operation unit 70), the system control unit 50 starts operations in the frame tracking mode. If the user issues an instruction for moving the diorama frame 302 in a case where the AF frame 301 is positioned inside the diorama frame 302 as shown in FIG. 11A, the system control unit 50 moves the frames while maintaining a positional relationship between the diorama frame 302 and the AF frame 301 (see FIG. 11B). On the other hand, if the user issues an instruction for moving the AF frame 301, the system control unit 50 moves only the AF frame 301, and does not move the diorama frame 302 (see FIG. 11C). That is to say, in response to an operation of moving the diorama frame 302, the diorama frame 302 is moved, and the AF frame 301 is also moved in accordance with the movement of the diorama frame 302. Conversely, in response to an operation of moving the AF frame 301, the AF frame 301 is moved without moving the diorama frame 302. Note that the system control unit 50 may be configured to make the diorama frame 302 follow the AF frame 301, rather than making the AF frame 301 follow the diorama frame 302. That is to say, in response to an operation of moving the AF frame 301, the AF frame 301 may be moved, and the diorama frame 302 may also be moved in accordance with the movement of the AF frame 301. In this case, conversely, in response to an operation of moving the diorama frame 302, the diorama frame 302 is moved without moving the AF frame 301. In this way, the system control unit 50 makes one frame follow the other frame in the frame tracking mode.

As described above, according to the first embodiment, the digital camera 100 warns (notifies) the user when the AF frame 301 is outside the diorama frame 302. This can reduce the possibility that the user accidentally sets the AF frame 301 outside the diorama frame 302.

Note that the foregoing various types of control, which have been described as being performed by the system control unit 50, may be performed by one item of hardware, or the entire apparatus may be controlled by a plurality of items of hardware sharing processing.

Furthermore, although the present invention has been elaborated based on a preferred embodiment thereof, the present invention is not limited to such a specific embodiment, and the present invention also includes a variety of embodiments within a range that does not depart from the principles of this invention. In addition, each of the foregoing embodiments is merely one illustrative embodiment of the present invention, and various embodiments can be combined as appropriate.

Moreover, although the foregoing embodiment has been described based on an exemplary case where the present invention is applied to a digital camera, the present invention is not limited to this example, and can be applied to an image capturing control apparatus that controls image capture in a diorama mode (also referred to as a miniature mode and the like in some cases). That is to say, the present invention can be applied to a personal computer, a PDA, a mobile telephone terminal, a mobile image viewer, a display-equipped printer apparatus, a digital photo frame, a music player, a game console, an electronic book reader, etc. Furthermore, the present invention can also be applied to a tablet terminal, a smartphone, a projection apparatus, a display-equipped home electronic apparatus, an onboard apparatus, etc. Moreover, the present invention can further be applied to an apparatus that receives a live-view image shot by a digital camera and the like via wireless or wired communication, displays the received live-view image, and remotely controls the digital camera (including a network camera); examples of such an apparatus include a smartphone, a tablet PC, and a desktop PC.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-005270, filed Jan. 16, 2017, which is hereby incorporated by reference herein in its entirety.

What is claimed is:

1. An image capturing control apparatus, comprising:
at least one processor and/or at least one circuit to perform operations of following units:
a non-blur region setting unit configured to set, within a screen, a non-blur region to which blur processing is not applied;
a focus detection region setting unit configured to, in response to an operation performed by a user, set, within the screen, a focus detection region in which focus detection is performed, wherein the focus detection region is settable outside the non-blur region within the screen in response to the operation performed by the user;
a processing unit configured to apply the blur processing to a region of an image captured by an image capturing unit excluding the non-blur region and not to apply the blur processing to a region of the image captured by the image capturing unit including the non-blur region and
a control unit configured to, when the focus detection region is outside the non-blur region, perform control to issue a notification that is not issued when the focus detection region is inside the non-blur region.

2. The image capturing control apparatus according to claim 1, wherein
the control unit performs control to display, within the screen, a display item with which the user issues an instruction for making a transition to an operation mode that enables the user to set the non-blur region, and
the issuance of the notification includes changing of a display appearance of the display item by the control unit.

3. The image capturing control apparatus according to claim 1, wherein
the control unit performs control to display, within the screen, a display element indicating the non-blur region and a display element indicating the focus detection region, and
the issuance of the notification includes changing of a display appearance of at least one of the display element indicating the non-blur region and the display element indicating the focus detection region to a display appearance different from a case where the focus detection region is inside the non-blur region, the changing being performed by the control unit.

4. The image capturing control apparatus according to claim 1, wherein
the at least one processor and/or at least one circuit further performs an operation of a reset unit configured to move the non-blur region to a predetermined position and also move the focus detection region to a predetermined position inside the non-blur region, and
the issuance of the notification includes displaying, within the screen, a display element that suggests the user to instruct the reset unit to move the non-blur region and the focus detection region, the displaying being performed by the control unit.

5. The image capturing control apparatus according to claim 1, wherein
the at least one processor and/or at least one circuit further performs an operation of a focus detection region moving unit configured to move the focus detection region to the inside of the non-blur region, and
the issuance of the notification includes displaying, within the screen, information that suggests the user to instruct the focus detection region moving unit to move the focus detection region, the displaying being performed by the control unit.

6. The image capturing control apparatus according to claim 1, wherein
the at least one processor and/or at least one circuit further performs an operation of a non-blur region moving unit configured to move the non-blur region so that the focus detection region is included in the non-blur region, and
the issuance of the notification includes displaying, within the screen, information that suggests the user to instruct the non-blur region moving unit to move the non-blur region, the displaying being performed by the control unit.

7. The image capturing control apparatus according to claim 1, wherein
the focus detection region setting unit is capable of moving the focus detection region within the screen in response to a first operation and a second operation, and
the control unit further performs control to
when the first operation has been performed, move the focus detection region regardless of whether the focus detection region is to be moved to the outside of the non-blur region, and
when the second operation has been performed, move the focus detection region in a case where a position to which the focus detection region is to be moved in response to the second operation is inside the non-blur region, and not move the focus detection region in a case where the position to which the focus detection region is to be moved in response to the second operation is outside the non-blur region.

8. The image capturing control apparatus according to claim 1, wherein
when a shooting mode in which the blur processing is applied has been set, the control unit further performs control to accept a user operation of moving the non-blur region before performing control to accept a user operation of moving the focus detection region.

9. The image capturing control apparatus according to claim 1, wherein
a live-view image captured by the image sensor is displayed on the screen, and
the control unit further performs control to apply image processing different from the blur processing to the outside of the non-blur region so that the inside and the outside of the non-blur region are identifiable and visually recognizable on the screen.

10. The image capturing control apparatus according to claim 1, wherein
the control unit further performs control to
move the non-blur region in response to an operation of moving the non-blur region, and also move the focus detection region in accordance with the movement of the non-blur region, and
move the focus detection region without moving the non-blur region in response to an operation of moving the focus detection region.

11. The image capturing control apparatus according to claim 1, wherein
the control unit further performs control to
move the focus detection region in response to an operation of moving the focus detection region, and also move the non-blur region in accordance with the movement of the focus detection region, and
move the non-blur region without moving the focus detection region in response to an operation of moving the non-blur region.

12. The image capturing control apparatus according to claim 1, wherein
the non-blur region is a region to which the blur processing is not applied in a shooting mode that generates an image by applying the blur processing to a region of an image captured by the image sensor excluding the non-blur region.

13. The image capturing control apparatus according to claim 1, further comprising:
the image sensor;
wherein the at least one processor and/or at least one circuit further performs operations of following units:
an image capturing control unit configured to perform control to execute autofocus (AF) in the focus detection region and then perform image capture using the image sensor; and
a recording unit configured to record the image processed by the processing unit to a recording medium.

14. A control method executed by an image capturing control apparatus, comprising:
setting, within a screen, a non-blur region to which blur processing is not applied;
in response to an operation performed by a user, setting, within the screen, a focus detection region in which focus detection is performed, wherein the focus detection region is settable outside the non-blur region within the screen in response to the operation performed by the user;
applying the blur processing to a region of an image captured by an image sensor excluding the non-blur region and not applying the blur processing to a region of the image captured by the image sensor including the non-blur region; and
when the focus detection region is outside the non-blur region, performing control to issue a notification that is not issued when the focus detection region is inside the non-blur region.

15. A non-transitory computer-readable storage medium which stores a program for causing a computer to execute a control method comprising:
setting, within a screen, a non-blur region to which blur processing is not applied;
in response to an operation performed by a user, setting, within the screen, a focus detection region in which focus detection is performed, wherein the focus detection region is settable outside the non-blur region within the screen in response to the operation performed by the user;
applying the blur processing to a region of an image captured by an image sensor excluding the non-blur region and not applying the blur processing to a region of the image captured by the image sensor including the non-blur region; and
when the focus detection region is outside the non-blur region, performing control to issue a notification that is not issued when the focus detection region is inside the non-blur region.

* * * * *